United States Patent
Miller et al.

(10) Patent No.: US 9,173,074 B2
(45) Date of Patent: Oct. 27, 2015

(54) PERSONAL HUB PRESENCE AND RESPONSE

(71) Applicant: QUALCOMM Incorporated, San Diego, CA (US)

(72) Inventors: Brian F. Miller, San Diego, CA (US); Jose Menendez, San Diego, CA (US); Rohit Sauhta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 13/686,899

(22) Filed: Nov. 27, 2012

(65) Prior Publication Data

US 2013/0316746 A1 Nov. 28, 2013

Related U.S. Application Data

(60) Provisional application No. 61/652,229, filed on May 27, 2012.

(51) Int. Cl.
*H04B 1/38* (2015.01)
*H04W 4/12* (2009.01)
(Continued)

(52) U.S. Cl.
CPC ............. *H04W 4/12* (2013.01); *H04L 12/5875* (2013.01); *H04L 51/30* (2013.01); *H04L 51/36* (2013.01); *H04W 4/02* (2013.01); *H04W 4/20* (2013.01)

(58) Field of Classification Search
USPC ........ 455/412.1, 412.2, 413, 414.1, 415, 416, 455/466, 420, 556.1
See application file for complete search history.

(56) References Cited

U.S. PATENT DOCUMENTS 7,016,707 B2 * 3/2006 Fujisawa et al. .............. 455/567
7,697,941 B2 4/2010 Griffin
(Continued)

FOREIGN PATENT DOCUMENTS

| EP | 0371609 A2 | 6/1990 |
| EP | 1202202 A2 | 5/2002 |
| WO | WO-9819438 A1 | 5/1998 |

OTHER PUBLICATIONS

International Search Report and Written Opinion—PCT/US2013/038745, International Search Authority—European Patent Office, Dec. 18, 2013.

(Continued)

*Primary Examiner* — Dai A Phuong
(74) *Attorney, Agent, or Firm* — Ryan N. Farr

(57) ABSTRACT

Methods, devices, and systems for transmitting convenient messages to a recipient for rendering based on the recipient's device availabilities. A recipient's mobile device may be connected to a personal hub and/or earpiece devices configured to render various incoming communications, such as audio messages and visual messages. The incoming messages may be delivered to the recipient's mobile device and other connected devices that may render the contents of the incoming messages. A delivery confirmation message that describes the receipt and use of incoming messages may be generated and returned to a sender's computing device. In an embodiment, the recipient's devices may generate status information for describing the status of devices to a sender's computing device. In an embodiment, the sender's computing device may generate and transmit outgoing messages formatted based on the received status information and including metadata that instructs the recipient's devices to render message content in particular manners.

20 Claims, 12 Drawing Sheets

(51) Int. Cl.
*H04L 12/58* (2006.01)
*H04W 4/02* (2009.01)
*H04W 4/20* (2009.01)

(56) References Cited

U.S. PATENT DOCUMENTS

| | | | |
|---|---|---|---|
| 7,702,282 | B2 | 4/2010 | Sandegard et al. |
| 7,715,873 | B1 | 5/2010 | Biere et al. |
| 7,996,496 | B2 | 8/2011 | Haartsen et al. |
| 7,996,571 | B2 | 8/2011 | Salokannel |
| 2002/0003468 | A1* | 1/2002 | Tsumura et al. ............. 340/7.52 |
| 2002/0132608 | A1 | 9/2002 | Shinohara |
| 2005/0060381 | A1 | 3/2005 | Huynh et al. |
| 2005/0233758 | A1 | 10/2005 | Salmi |
| 2007/0281762 | A1* | 12/2007 | Barros et al. ............... 455/575.6 |
| 2008/0040951 | A1 | 2/2008 | Kates |
| 2008/0112567 | A1 | 5/2008 | Siegel et al. |
| 2009/0054039 | A1 | 2/2009 | Van Wijk et al. |
| 2010/0173655 | A1* | 7/2010 | Choi et al. ..................... 455/466 |
| 2010/0240345 | A1 | 9/2010 | Karrman et al. |
| 2011/0056769 | A1* | 3/2011 | Czechowski et al. ........ 184/6.22 |
| 2011/0059769 | A1 | 3/2011 | Brunolli |
| 2011/0316698 | A1 | 12/2011 | Palin et al. |
| 2012/0044062 | A1* | 2/2012 | Jersa et al. .................. 340/407.1 |
| 2012/0196629 | A1* | 8/2012 | Movsesyan et al. .......... 455/466 |
| 2013/0225134 | A1* | 8/2013 | Earnshaw et al. ............. 455/413 |
| 2013/0324194 | A1* | 12/2013 | Sarin et al. .................... 455/567 |
| 2014/0256293 | A1* | 9/2014 | Thomas et al. ............. 455/412.1 |
| 2014/0324437 | A1* | 10/2014 | Huh et al. ..................... 704/260 |

OTHER PUBLICATIONS

Burger E., et al., "Message Context for Internet Mail; rfc3458.txt", Jan. 1, 2003, pp. 1-17, XP015009241, ISSN: 0000-0003.
Partial International Search Report—PCT/US2013/038745—ISA/EPO—Jul. 17, 2013.

* cited by examiner

PERSONAL HUB PRESENCE AND RESPONSE

RELATED APPLICATIONS

The present non-provisional patent application claims the benefit of priority to U.S. Provisional Application No. 61/652,229 entitled "Personal Hub Presence and Response," and filed May 27, 2012, the entire contents of which are hereby incorporated by reference.

BACKGROUND

Mobile devices, such as mobile phones, smart phones, tablets, or laptops, may have various types of user notifications including audio, visual, and haptic (e.g., vibration) notifications. These devices may also include various modes combining or restricting some of these notifications (e.g., a smart phone set to vibrate may not ring or a laptop allowing a pop up reminder may not sound an alarm when sound is muted). Current mobile devices may allow users to control notification modes (e.g., silencing a ringing phone that may be interrupting a meeting or movie). However, mobile device users may call or text a friend, family member, or co-worker without actually knowing if their message was received, seen, or ignored. Mobile device users can be frustrated by having no contextual or definitive confirmation of the receipt and ingestion of their messages. Typically, users must wait for a response from the recipient or try sending redundant messages to expedite their communication attempts. Message recipients may be inconvenienced by multiple messages and the social discomfort of being unable to easily describe their availability to those attempting to contact them.

SUMMARY

Methods, devices, and systems enable various embodiments for transmitting convenient messages to a recipient for rendering based on the recipient's device availabilities. In particular, a recipient may utilize a mobile device with a connected personal hub, wireless earpieces, and/or other associated devices to determine and transmit their status information to a sender's computing device and/or a server for storage. The status information may include status indicators, such as whether a device is activated, currently in a voice call or some other form of use, mute, or in silent mode. In an embodiment, the recipient's computing device may record and transmit information back to the sender's computing device describing the receipt and delivery of messages. In an embodiment, the sender's computing device may use status information describing the status of the recipient devices to generate messages that the recipient's personal hub and wireless earpieces may render in convenient ways for the recipient. In an embodiment, the recipient's personal hub may detect input from the recipient in response to rendering simple response options of a message received from a sender's computing device and generate a response message based on the detected input.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
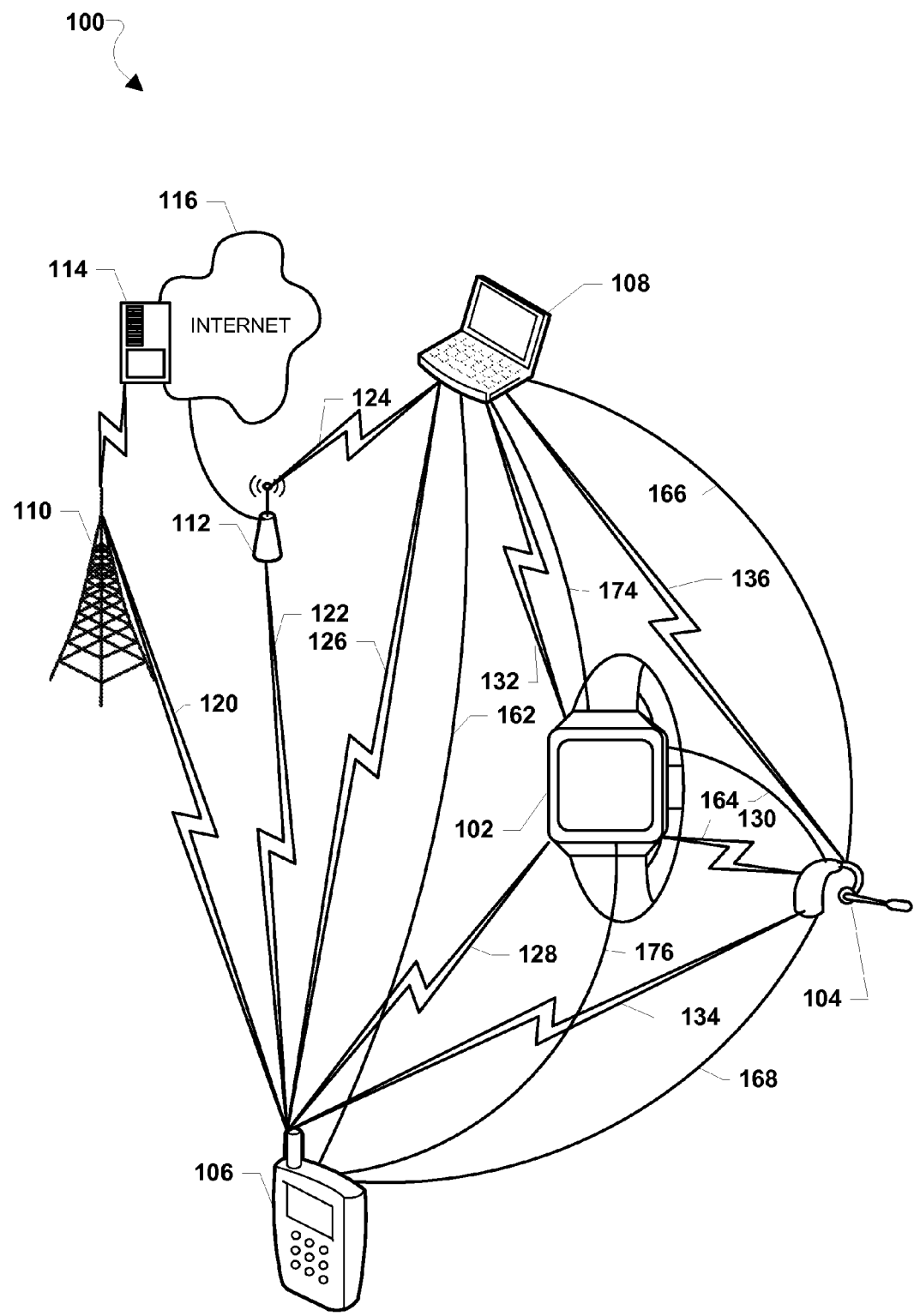
FIG. 1 is a communication system block diagram of another network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "mobile device" is used herein to refer to any one or all of mobile computing devices, such as cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for sending and/or receiving voice and data calls, sending and/or receiving messages (e.g., short message service (SMS) messages, e-mails, application notifications, such as Facebook® post notifications and/or game high score change notifications, etc), sending and/or receiving warnings (e.g., low battery warnings, loss of network connectivity warnings, etc), and/or sending and/or receiving reminders (e.g., calendar reminders, task reminders, etc).

The term "personal hub" is used herein to refer to any device that may be worn or carried by a user and may interact with a variety of mobile devices and/or earpieces. In an embodiment, a personal hub may be configured to be worn by a user around the user's wrist in a manner similar to that of a wrist watch. In alternative embodiments, a personal hub may be a badge, tag, bracelet, patch, belt buckle, medallion, pen, key chain, or any other device worn or carried by a user. In an embodiment, a personal hub may wirelessly communicate with a user's mobile device(s), such as a smart phone, and a wireless earpiece worn by the user. The personal hub may wirelessly communicate with the user's mobile device(s) to enable the user to operate the user's mobile device(s) remotely. In an embodiment, a personal hub system may comprise a personal hub and one or two wireless earpieces worn by the user, together enabling a personal hub system user to utilize a user's mobile device(s) remotely.

As used herein, the term "sender" refers to a person sending a message using a computing device, such as a smart phone, a tablet device, a laptop computer, or any other device capable of transmitting SMS text messages, emails, audio data, visual data (e.g., images), or any other such electronic communications. Senders may also employ a personal hub and wireless earpieces when sending messages, although this is not necessary. As used herein, the term "recipient" refers to a person using a mobile device plus a personal hub and wireless earpieces to receive and reply to incoming messages from a sender, such as audio messages, visual messages, voice calls, text based messages, social media messages, and/or application reminders.

As used herein, the term "whisper message" may be used to refer to an audio clip message that may be delivered to a mobile device for delivery via a speaker, such as a wireless earpiece described herein. In general, whisper messages may be communications in which selected individuals (e.g., individuals on a user-defined privileged list) may transmit an audio clip that when received is immediately played in the recipient user's ears like a whisper. Whisper messages may be sent in addition to SMS, MMS and email messages. A sender wishing to send a whisper message may record the message, such as by speaking a brief verbal message into their mobile device (which may be running an application for creating whisper messages such as YagattaTalk®), and then press a send key or icon. The audio clip data may be transmitted through a wireless network (e.g., either a cellular data network or a WiFi network depending upon current connectivity) and delivered to the intended recipient's mobile device. The recipient's mobile device may confirm that the sender is on a privileged list, and if so, immediately play the audio clip through one or both of the ear pieces. In this manner, privileged senders can deliver a personal audio message to a recipient with the message being played immediately (or in response to a user action) in the recipient's ear just like a private whisper.

The various embodiments provide methods, devices, and systems for transmitting convenient messages to a recipient for rendering based on the recipient's device availabilities. In general, a mobile device may be paired with a personal hub, a wireless earpiece, and various other communication devices configured to render incoming messages, such as a voice call (e.g., PSTN call, VOIP call, cellular call, etc), text based message (e.g., SMS, e-mail), social media message (e.g., Facebook® notification, Tweet®, etc), whisper message (e.g., a recorded voice message from a YagattaTalk® user), and/or application reminder (e.g., E-bay® auction notification, remote based calendar application reminder, etc). In response to receiving the incoming communication, the mobile device may render the received communication. For example, the mobile device may display a text message, play an audio message, or render a visual message. Alternatively, the mobile device may relay the received communication for rendering by the personal hub, wireless earpieces, and/or any other connected devices (e.g., a laptop, etc.). For example, an incoming message may be rendered as audio within a connected wireless earpiece device.

Based on the receipt and use of a message received from a sender, the recipient's mobile device may generate a delivery confirmation message for transmission back to the sender. The delivery confirmation message may contain timestamp information, identities of the various recipient devices (e.g., personal hub, wireless earpiece, etc.) to which the message (or its contents) was transmitted, and also descriptions of the manner in which the received message was displayed, played or otherwise rendered, as well as any recipient interactions with the message (e.g., an acknowledgement, play selection, etc.). For example, the delivery confirmation message may report that the sender's audio message was received by the recipient's personal hub and played through connected wireless earpieces. By providing the sender with information regarding whether and the manner in which a message was delivered to the recipient may be useful in situations where delivery of the message is important to the sender or the recipient but the recipient is otherwise not able to immediately respond.

Additionally, a recipient's mobile device (e.g., smart phone, tablet, etc.), personal hub, and/or wireless earpieces may generate status information that describes the status of the recipient's devices. For the purposes of this disclosure, status information may be data that reflects the activities and/or availability of the recipient as well as his/her personal hub and/or wireless earpiece devices. For example, status information may include software settings (e.g., phone display lock, screen saver, etc.), information describing the privileged relationship between a sender and the recipient, a list of devices wirelessly connected to the recipient's mobile device or personal hub, information about the recipient's recent activities with the devices (e.g., recent input on touch screen unit or apps recently used), and data from sensors contained within the recipient's personal hub and/or wireless earpiece devices (e.g., temperature from sensors in the wireless earpieces, motion sensors in the wireless earpieces and/or personal hub, touch data from touch sensors in the wireless earpieces and/or personal hub, etc.). Status information may include information that may be relayed from the recipient's mobile device, personal hub and/or wireless earpiece devices that enables a sender or sender's computing device to determine the availability and best modes for communicating with the recipient, effectively providing a virtual presence of the recipient to the sender.

A sender's computing device may transmit a message to the recipient's mobile device requesting the recipient's status information. The sender's computing device may receive a message describing the recipient's status information (e.g., privilege status between the sender and the recipient, a list of devices connected to the recipient's mobile device, information about recent activities of devices connected to the recipient's mobile device, sensor data, etc.) and may interpret the recipient's availability to receive substantive messages from the sender's computing device. For example, the sender's computing device may interpret status information to describe the recipient as in a meeting or on a jog. In an embodiment, the recipient's mobile device may periodically determine status information and transmit the information to a server for storage and distribution to the sender's computing device.

Based on the status information, the sender's computing device may recommend certain formatting, message templates, delivery methods, message types (e.g., email, audio messages, visual messages, SMS text message, whisper message, etc.) or other configurations for the sender's substantive message to the recipient's mobile device. In an embodiment, the sender's computing device may use software that utilizes a whisper application (or "app") that may display the intended recipient's status information, recommend a message format or mode (e.g., whisper message, SMS, email, phone call, etc.), receive sender inputs, and create messages for transmission to and presentation on a recipient's mobile device, personal hub and/or wireless earpieces. The whisper app may format messages based on the recipient's status information by using metadata or other data-encoding techniques such that particular content may be rendered by an appropriate one or more of the recipient's devices. For example, if the status information indicates the recipient is currently using the personal hub and wearing at least one wireless earpiece, the whisper app may prompt the sender to speak a whisper message, capture the sender's speech, and create an audio message to be transmitted to the recipient's mobile device for rendering through one or both wireless earpieces.

In an embodiment, the recipient's devices may decode and present to the recipient received messages, receive recipient inputs (e.g., taps or speech) for responding, and format response messages so as to provide a convenient response opportunity based on the recipient's status information. In an embodiment, the sender's computing device may utilize a whisper app to generate a message that includes simple response options (e.g., "yes," "no," "option one or option two," etc.) from which the recipient may easily indicate a selection without having to type or dictate a response. For example, an audio message may include an interrogatory (or question) with answer options 'yes' and 'no'. A recipient's mobile device, personal hub, and wireless earpieces may decode metadata within the sender's message to obtain instructions for rendering the message contents (e.g., formatting of rendered message contents, which connected device should render various message contents, etc.). As an example, a message presented to the recipient aurally may receive an answer input in the form of a touch on one side of the personal hub device display (or button) to indicate "yes" response and a touch on the other side of the display to indicate a "no" response. Additionally, a user may tap and hold the "yes" or "no" buttons to indicate their answer and record a whisper to provide further explanation. As another example, a message presenting to the recipient aurally may direct audio explaining a first option in the right wireless earpiece to indicate that the recipient can select the first option by touching the right earpiece, and direct audio explaining a second option in the left wireless earpiece to indicate that the recipient can select the second option by touching the left earpiece. Additionally, a user may tap and hold an earpiece to indicate their answer and record a whisper to provide further explanation.

In an embodiment, the recipient personal hub and other connected devices may detect recipient inputs from sensors (e.g., touch sensors configured to detect touch interactions, accelerometers configured to detect a tap, etc.) or interactions with a graphical user interface unit, and may generate response messages based on the received formatted sender message. For example, based on touch sensor and/or accelerometer data, the personal hub may determine that the recipient user tapped the right wireless earpiece in response to the playback of selected audio (e.g., 'yes') in that ear. In an embodiment, the personal hub or recipient's mobile device may generate a response message based on the recipient's simple response options.

FIG. 1 illustrates a network system 100 suitable for use with the various embodiments employing wired and/or wireless data links. The network system 100 may include multiple devices, such as a personal hub 102, an earpiece 104, and two mobile devices, such as a smart phone mobile device 106 and laptop computer 108. In an embodiment, the personal hub 102, earpiece 104, smart phone mobile device 106, and laptop computer 108 may be configured to exchange data over either or both wired and wireless data links.

The personal hub 102 and the earpiece 104 may exchange data via a wireless data link 130 and/or a wired data link 164. As an example, the wireless data link 130 between the personal hub 102 and the earpiece 104 may be a Bluetooth® connection. Similarly, the personal hub 102 and the smart phone mobile device 106 may exchange data via a wireless data link 128 and/or a wired data link 176, and the personal hub 102 and the laptop computer 108 may exchange data via a wireless data link 132 and/or a wired data link 174. The smart phone mobile device 106 and the earpiece 104 may exchange data via a wireless data link 134 and/or wired data link 168. The smart phone mobile device 106 and the laptop computer 108 may exchange data directly with each other via a wireless data link 126 and/or wired data link 162. The earpiece 104 and the laptop computer 108 may exchange data directly with each other via a wireless data link 136 and/or wired data link 166. In various embodiments, the wireless data links 126, 128, 130, 132, 134 and 136 may be Bluetooth®, Zigbee®, Peanut®, or RF data links. In the various embodiments, the wired data links 162, 164, 168, 166, 174 and 176 may be cable connections, such as a USB cable, a FireWire® cable, or standard audio analog or digital cables with suitable connectors at each end.

Additionally, the smart phone mobile device 106 and the laptop computer 108 may be configured to connect to the Internet 116 via wireless connections 122 and 124, respectively, which may be established with a wireless access point 112, such as a Wi-Fi access point. The wireless access point 112 may be connected to the Internet 116. In this manner data may be exchanged between the smart phone mobile device 106, the laptop computer 108, and other Internet 116 connected devices by methods well known in the art. Additionally, the smart phone mobile device 106 and a cellular tower or base station 110 may exchange data via a cellular connection 120, including CDMA, TDMA, GSM, PCS, G-3, G-4, LTE, or any other type connection. The cellular tower or base station 110 may be in communication with a router 114 which may connect to the Internet 116. In this manner, data (e.g., voice calls, text messages, e-mails, etc) may be exchanged between the smart phone mobile device 106 and other devices by methods well known in the art.

In the various embodiment methods 200, 300, 400, 600, and 700 discussed below, the personal hub 102, the earpiece 104, and the smart phone mobile device 106 may communicate with each other using any combination of wired or wireless connections. For example, the smart phone mobile device 106 may have a wired data link 176 to the personal hub 102 and a wireless data link 134 to the earpiece 104. In other words, with embodiments employing wireless data links 126, 128, 130, 132, 134, and/or 136, wired data links 162, 176, 164, 174, 168, and/or 166 may be substituted. With such substitutions, the operations of methods 200, 300, 400, 600, and 700 discussed below may be performed in substantially similar manners over wired data links or combinations of wired and wireless data links.

In an embodiment, the earpiece 104 may be connected to the smart phone mobile device 106 via a wired data link 168, and the smart phone mobile device 106 may be connected to the personal hub 102 via a wireless data link 128. In this configuration, messages may be handled wirelessly between the smart phone mobile device 106 and the personal hub 102, while audio signals may be handled via the wired connection between the smart phone mobile device 106 and the earpiece 104. The wired data link 168 between the smart phone mobile device 106 and the earpiece 104 may reduce the processing required to generate, send, and/or receive wireless signals which may conserve battery power on the smart phone mobile device 106 and earpiece 104.

In another embodiment, the personal hub 102 may be connected to the smart phone mobile device 106 and/or laptop computer 108 via wireless data links 128 and/or 132, respectively, and the personal hub 102 may be connected to the earpiece 104 by a wired data link 164. In a further embodiment, the earpiece 104 may be connected to the smart phone mobile device 106 and/or laptop computer 108 via wireless data links 134 and/or 136, respectively. In this configuration the personal hub 102 may send/receive information to/from the earpiece 104 via a wired connection while the earpiece 104 may send/receive information to/from the smart phone mobile device 106 and/or laptop computer 108 via a wireless connection.

In an additional embodiment, the smart phone mobile device 106 may be connected to the laptop computer 108 via a wired data link 162, and the smart phone mobile device 106 may be connected to the personal hub 102 and earpiece 104 via wireless data links 128 and 134, respectively. In this configuration, the laptop computer 108 may send/receive information to/from the smart phone mobile device 106 via a wired connection, and the smart phone mobile device 106 may send/receive information to/from the personal hub 102 and/or earpiece 104 via wireless connections. As an example, while the smart phone mobile device 106 is connected to the laptop computer 108 via a USB connection while the smart phone mobile device 106 is charging, the smart phone mobile device 106 may receive a reminder via the USB connection, and the smart phone mobile device 106 may wirelessly send an alert message associated with the reminder to the personal hub 102.

The private message delivery mechanisms enabled by the personal hub device (e.g., quiet vibration and small display) and wireless earpieces (which generate sound heard only by the recipient) permit users to receive messages in situations where normal smartphone operation is inappropriate or not permitted. To avoid being disturbed by unimportant messages, users may designate certain individuals authorized to send messages that are delivered by such private message delivery mechanisms even when the user's mobile device is in mute. Such designated individuals may be included in a privileged list. If desired, those on the user's list may have the privilege to designate their messages for immediate delivery when the recipient is wearing the communication devices. Individuals on a user's privileged list may be authorized to receive the user's current status information.

The personal hub 102 may exchange data with the user's mobile device, such as a smart phone mobile device 106 and laptop computer 108 and act as a message control center or handy message notification display. For example, the personal hub 102 and the smart phone mobile device 106 may exchange data via a wireless data link 128, and the personal hub 102 and the laptop computer 108 may exchange data via a wireless data link 132.

The personal hub 102 may serve as a wearable interface for any of a number of user computing devices, particularly mobile devices that are within close range of the user. For example the personal hub 102 may serve as a message notification and management center enabling a user to monitor and react to various types of messages received on the user's laptop computer 108. Also, the personal hub 102 may serve a similar function for messages received on the smart phone mobile device 106. The personal hub 102 may also perform the same functions for both the user's laptop computer 108 and smart phone mobile device 106 when both devices are in communication range. For ease of description the descriptions of the various embodiments refer to interactions with and operations performed by the user's "mobile device" which is intended to encompass any computing device communicating with the user's personal hub 102, including but not limited to a smart phone mobile device 106, a laptop computer 108 or any other mobile device.

Figure 2:
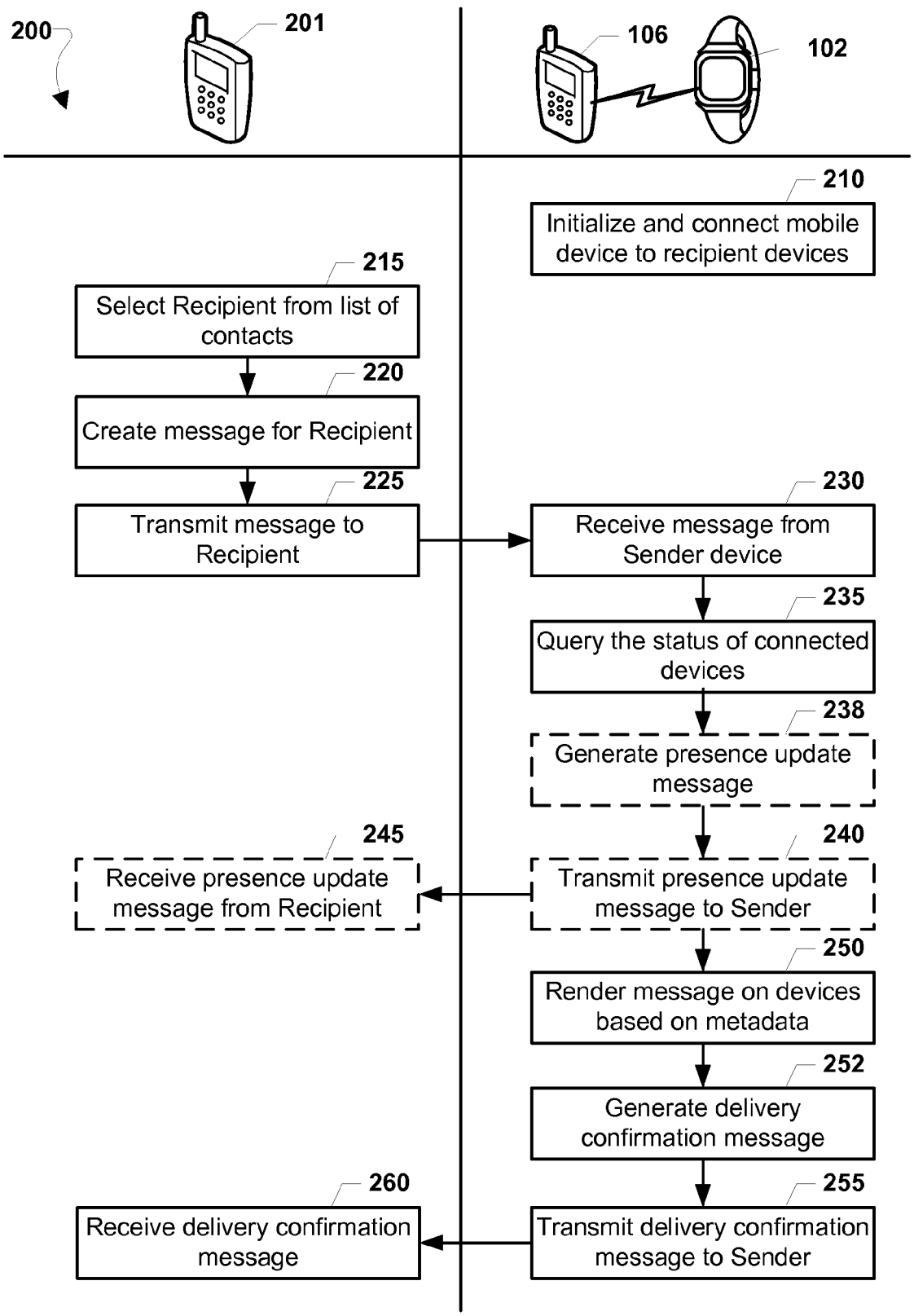
FIG. 2 is a process flow diagram illustrating an embodiment method for sending messages and receiving the recipient's status information.
Figure 3:
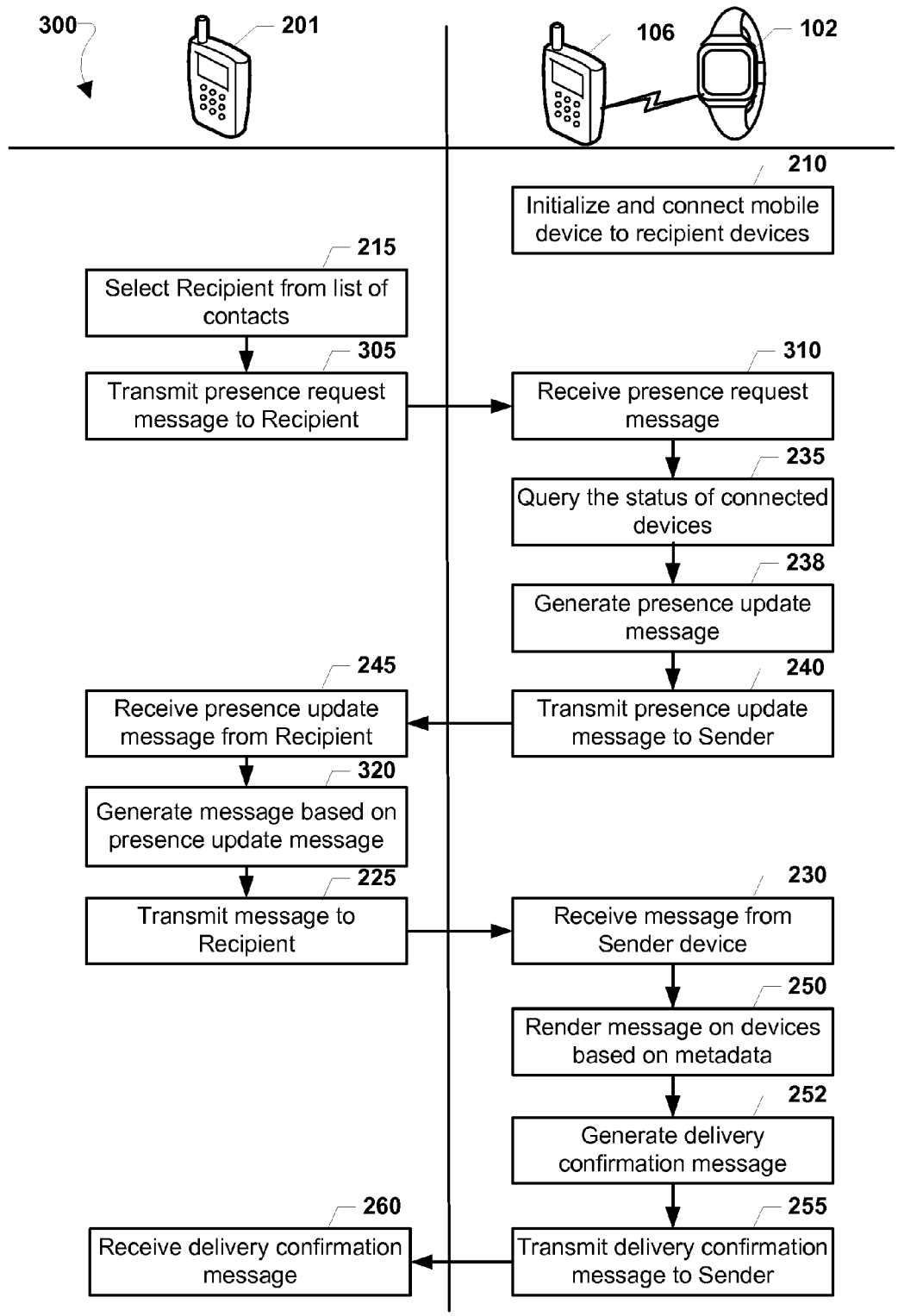
FIG. 3 is a process flow diagram illustrating an embodiment method for directly pulling a recipient's status information and sending messages based on the status information.
Figure 4:
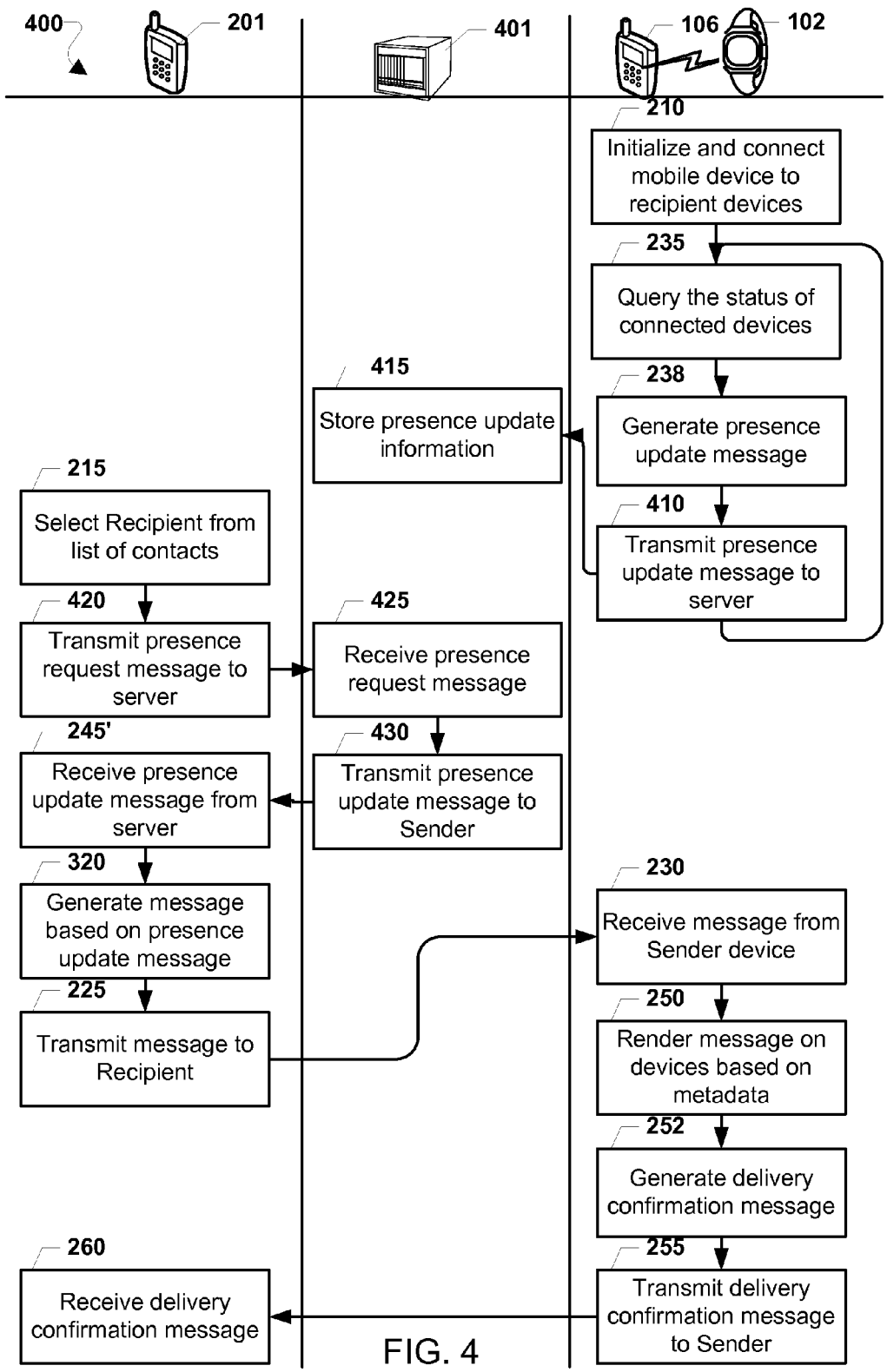
FIG. 4 is a process flow diagram illustrating an embodiment method for retrieving a recipient's status information from a server and sending messages based on the status information.

FIGS. 2-4 illustrate various embodiment methods for a recipient's mobile device communicating data that describes conditions during receiving, relaying, and rendering messages received from a communication system as described above. In particular, the recipient's mobile device may be configured to communicate delivery confirmation of received messages by obtaining instructions for rendering a received message on the recipient's mobile device from the received message, generating a delivery confirmation message reporting whether the received message was delivered and, when the received message was delivered, a manner in which the received message was delivered, and transmitting the delivery confirmation message to a sender of the received message. In another embodiment, reporting the manner in which the received message was delivered may include reporting information describing at least one of an identity of a device that is associated with the recipient's mobile device, a first indicator of whether message contents of the received message were successfully rendered by the device associated with the recipient's mobile device, and a second indicator of whether message contents of the received message were queued for rendering by the device associated with the recipient's mobile device. In an embodiment, the received message may be one of an email, a whisper message, an SMS text message, an audio message, a visual message, a video call, a telephone call, and a message formatted for use with whisper software. In another embodiment, obtaining instructions for rendering a received message on the recipient's mobile device from the received message may include decoding the received message to obtain metadata indicating a device on which the sender desires the received message to be rendered and at least one of sound and visual message contents, determining whether the device indicated in the metadata is connected to the recipient's mobile device, and providing the at least one of sound and visual message contents to the device indicated in the metadata when that device is connected to the recipient's mobile device. In another embodiment, the method may further include receiving input data from at least one of the recipient's mobile device and a device connected to the recipient's mobile device in response to the received message, and generating a response message based on the received input data. In another embodiment, the received input data may be at least one of an input on a graphical user interface and sensor data, wherein sensor data includes data received from a sensor selected from a group consisting of a touch sensor, an accelerometer, a gyroscope, and a magnetometer.

FIG. 2 illustrates an embodiment method 200 for sending messages and receiving status information from devices employed by a recipient. In block 210, a recipient's mobile device 106 may be initialized and connected to recipient devices. For example, the mobile device 106 may be a smart phone that exchanges short-range radio signals with a personal hub 102, which make exchange short-range radio signals with at least one wireless earpiece.

In block 215, a sender's computing device 201 may select the recipient from a list of contacts. For example, the sender's computing device 201 may display a stored list of contacts, such as in an address book database, and receive selection input data from the sender, such as by detecting the sender's touch on the area of the sender's computing device 201 touch screen that represents a contact name. The sender's computing device 201 may be configured to store and relate contact names with phone numbers, fax numbers, email addresses, and other information for establishing communications and/or transmitting messages. In an embodiment, the contact information may be used by the sender's computing device 201 to determine destination addresses for SMS text messages, whisper messages, visual messages, video calls, audio telephone calls, data messages, emails, and any other form of communication. In an embodiment, if the sender's computing device 201 maintains multiple contact addresses for the selected recipient, the sender's computing device 201 may prompt the sender to supply further inputs to determine a method of communication with the selected recipient. For example, the sender's computing device 201 may respond to the selection of the recipient contact by prompting the sender to further select whether to generate an email, an SMS text message, a whisper message, an audio message, a visual message, a video call, or establish a conventional vocal conversation (e.g., a telephone call).

In an embodiment, the sender's computing device 201 may store and execute software applications or routines that perform the communication services or protocols described above. For example, the sender's computing device 201 may store and execute a whisper app, with which the sender's computing device 201 may receive sender input that directs the app to create a whisper message. In an embodiment, the sender's computing device 201 may have an address book, a priority list, and/or a privileged list which stores the contact information for other devices (e.g., mobile devices 106 and personal hubs 102) which may identify individuals (i.e., contacts) who have included the sender in their privileged lists. For example, the sender's computing device 201 may receive a message indicating that the sender has been added to a recipient's privileged list and note that information in the contacts database as someone to which the sender can send whisper message transmissions. In another embodiment, the sender's computing device 201 may instead contain a database that stores device contact information to which the sender's computing device 201 may transmit privileged transmissions, such as whisper messages. In an embodiment, the sender's computing device 201 may transmit but not receive privileged communications to a particular recipient device.

In block 220, the sender's computing device 201 may create a message for the recipient that was selected in block 215. For example, the sender's computing device 201 may enter an email message creation routine in response to the sender selecting the recipient's email address. The sender's computing device 201 may receive input, such as speech, text, and/or selection of displayed options, and generate a complete message configured to be transmitted to the recipient's destination address as defined by the selected recipient information. In block 225, the sender's computing device 201 may transmit the message to the recipient, for example, to the recipient's mobile device 106.

In block 230, the recipient's mobile device 106 may receive the message from the sender's computing device 201. A mail server or cellular network messaging server may push the message to the recipient's mobile device 106. Alternatively, the recipient's mobile device 106 may receive an alert that the message is available for download from a remote server.

In block 235, the recipient's mobile device 106 may query the status of connected devices. For example, the recipient's mobile device 106 may obtain status information from the recipient's mobile device, personal hub and/or wireless earpieces. In particular, the recipient's mobile device may determine device settings by polling the devices to determine configuration settings, such as activity modes and operating parameters. For example, the recipient's mobile device 106 may determine whether the recipient's mobile device 106 is in silent mode. Other such device settings the recipient's mobile device 106 detects may include whether the phone lock is engaged (e.g., an authentication routine is executing that may require user input or password), or whether a vibration mode is engaged. The recipient's mobile device 106 may also determine whether there are active connections with the personal hub 102, nearby laptop computers, and other wireless devices. For example, the recipient's mobile device 106 may determine whether there are any active data links between the recipient's mobile device 106 and the personal hub 102, such as Bluetooth® pairings/links. In an embodiment, the initialization operations in block 210 may be recorded and used by the recipient's mobile device 106 to indicate status information of the recipient at a given time.

The recipient's mobile device 106 may also determine the status of the recipient by polling the sensors within the personal hub 102. In an embodiment, the recipient's mobile device 106 may query the personal hub 102 to determine movement, acceleration, and other recipient activities based on data collected by sensors. For example, the personal hub 102 may report to the recipient's mobile device 106 that a temperature sensor positioned at the bottom of the personal hub 102 (e.g., in contact with the recipient's wrist) recently measured body temperature, or the same temperature as measured by temperature sensors contained within the wireless earpieces. As another example, the personal hub 102 may report that measurements taken from a temperature sensor, gyroscope, magnetometer, and/or an accelerometer located within a wireless earpiece were static for a period of time. In an embodiment, the recipient's mobile device 106 may contain various sensors, gather and store sensor measurements that may be used in determining the status of the recipient's mobile device 106. For example, the recipient's mobile device 106 may contain a gyroscope unit which measures motion activity.

In an embodiment, the recipient's mobile device 106, personal hub 102, and any other devices may store status indicators (i.e., codes) that describe the individual devices' configurations or settings. For example, the personal hub 102 may store a code which describes whether the personal hub has active Bluetooth® connections to other devices, is in a sleep or silent mode, or is currently rendering message data. In an embodiment, the various recipient devices may store status indicators representing the status of any other device or all recipient devices.

In optional block 238, the recipient's mobile device 106 may generate a presence update message. The presence update message may be based on the determined status of the recipient's mobile device 106, the personal hub 102, and/or other devices associated with the recipient. The contents of an embodiment of a presence update message are described below with reference to FIG. 5.

In an embodiment, the recipient's mobile device 106 may create the presence update message in the same form or delivery method as received from the sender's computing device 201 in block 230. For example, if the sender's computing device 201 transmitted an email to the recipient, the recipient's mobile device 106 may generate an email presence update message for transmission to the sender. In an embodiment, the contents and method of transmission of the presence update message may be determined by user configurations stored within a file on the recipient's mobile device 106. For example, the recipient may configure the recipient's mobile device 106 to only send presence update messages as SMS text messages. In an embodiment, the recipient may store configurations which prioritize various methods of transmission for the presence update messages and/or use contact information stored within the recipient's mobile device 106 to determine available methods of transmission for various senders. In an embodiment, the presence update message may contain a natural language summary of the recipient's status based on the determined status information. For example, the presence update message may contain a text segment which indicates that the recipient is asleep based on static motion data and regular temperature readings.

In optional block 240, the recipient's mobile device 106 may transmit the presence update message to the sender, for instance to the sender's computing device 201. In an embodiment, the recipient's mobile device 106 may only transmit the presence update message if the sender's computing device 201 (or its user) has been pre-approved, authenticated, or is a member of a privileged list stored on the recipient's mobile device 106 or personal hub 102. In an embodiment, the recipient's mobile device 106 may prompt the recipient to authorize a transmission of the presence update message. In another embodiment, the presence update message may further contain an indication that confirms that the sender is within the recipient's privileged list.

In optional block 245, the sender's computing device 201 may receive the presence update message from the recipient, for instance from the recipient's mobile device 106. In an embodiment, if the sender's computing device 201 executes a whisper application (or app), the sender's computing device 201 may execute routines to parse the presence update message and identify certain formatting information for rendering the presence update message. For example, the presence update message may contain header information which describes categorizations of the recipient's status and the status of the recipient's personal hub (e.g., whether it is currently worn and recently used) and the wireless earpieces (e.g., whether they are currently on the recipient's ears). In an embodiment, the sender's computing device 201 may detect information within the presence update message indicating that the sender is within the recipient's privileged list. For example, there may be a code that indicates the sender has a favored status with the recipient. In an embodiment, the sender's computing device 201 may render the presence update message as text, a graphical display, audio, or a combination of these.

In block 250, the senders's message, which was received in block 230, may be rendered on one or more devices (such as the recipient's mobile device 106, personal hub 102, and other devices connected to the mobile device 106) based on metadata. For example, the recipient's mobile device 106 may display a downloaded email message from the sender. As another example, the personal hub 102 may play an audio file attached to the sender's message through a wireless earpiece. In various embodiments, the sender's message may contain metadata indicating rendering instructions which the recipient's mobile device 106 may obtain by decoding and/or parsing the sender's message. In an embodiment, the sender's computing device 201 may utilize a whisper app to generate such instructions. The application and/or use of metadata within messages is described detail in below with reference to FIGS. 6-7.

In block 252, the recipient's mobile device 106 may generate a delivery confirmation message. The delivery confirmation message may be based on the manner in which the sender's message was presented to the user as well as any use of message by the recipient's devices, such as the recipient's mobile device 106 or personal hub 102. The recipient's mobile device 106 may monitor and record every access, modification, and exchange related to the sender's message, creating a data trail of the message through the recipient's devices. For example, the recipient's mobile device 106 may record whether the recipient sees, reads, or hears a message as well as whether the recipient saves a draft response to a whisper message or an SMS text message. As another example, the recipient's mobile device 106 may record the identity of the output devices (e.g., the personal hub 102, earpieces, etc.) that render a received whisper message or SMS text message. In an embodiment, the recipient's mobile device 106 may log the timestamp information for each received message, the time and identity of the destination device (or output device) for any transmission of the message or its associated content between the recipient's mobile device 106, the personal hub 102, and any other connected wireless devices, and the software on the respective devices which rendered, displayed, performed, or otherwise accessed the message and/or its associated content. For example, the recipient's mobile device 106 may log that the sender message was delivered to the recipient's mobile device 106 from a remote message server at a particular time and that it was transmitted to the personal hub 102 where it displayed as text on the display unit. The delivery confirmation messages may also report the manner in which the received message was delivered by including an indicator of whether message contents were successfully rendered by output devices and/or an indicator of whether message contents of the received message were queued for rendering by output devices.

In an embodiment, the delivery confirmation message may contain information indicating the manner in which the message was delivered to the recipient including the output devices that displayed or played the message, such as the recipient's mobile device, earpiece or personal hub. For example, the delivery confirmation message may state that the sender's audio message was played through two wireless earpiece devices. In an embodiment, the delivery confirmation message may contain similar information as the presence update message.

In an embodiment, either the recipient's mobile device 106 or the sender's computing device 201 may process delivery confirmation information to determine the likelihood that the recipient accessed or played the sender's message. For example, the recipient's mobile device 106 may evaluate logged timestamps, access reports, and device status to interpret if the recipient played an audio file. As another example, the sender's computing device 201 may receive and process the delivery confirmation message to determine the likelihood. The determined likelihood may be expressed within the delivery confirmation message as a probability, a natural language summary, or any other manner of representing the recipient's mobile device 106 evaluation. In an embodiment, the likelihood evaluation may be conducted by a whisper app running on either of the devices 106, 201.

In block 255, the recipient's mobile device 106 may transmit the delivery confirmation message to the sender's computing device 201. In block 260, the sender's computing device 201 may receive the delivery confirmation message, which was transmitted in block 255. In an embodiment, the sender's computing device 201 may process and render the contents of the delivery confirmation message as graphical indicators in a messaging application. For example, the sender's computing device 201 may receive and process the delivery confirmation message and draw a prompt on the display unit informing the sender that the sender's message was delivered and opened by the recipient including displaying an icon of the device that rendered the message.

FIG. 3 illustrates an embodiment method 300 for directly pulling a recipient's status information and sending messages based on the status information. The method 300 is similar to the method 200 described above, however here a sender's computing device 201 may retrieve status information describing a recipient's devices' status and generate messages having formatting based on the status information. The operations in blocks 210-215 are as described above with reference to FIG. 2.

In block 305, the sender's computing device 201 may transmit a presence request message to the recipient who was selected in block 215. In an embodiment, the presence request message may include a predefined system call, an API command, or any other software command that a recipient's mobile device 106 may interpret as a request to query devices. In an embodiment, the presence request message may simply include email, SMS text, whisper message content, or audio content that indicates the sender's desire to obtain the recipient's status information. For example, the recipient's mobile device 106 may recognize a presence request in response to receiving an email from the sender that asks "what's your status?" In another embodiment, the sender's computing device 201 may transmit a presence request message after receiving sender input on the sender's computing device 201. For example, the sender's computing device 201 may send a presence request message in response to detecting a user click on a graphical user interface button beside the recipient's name in a contact list. In another embodiment, the sender's computing device 201 may execute background routines that periodically transmit presence request messages for some or all contacts within a stored contact list. For example, the sender's computing device 201 may automatically send presence request messages to some or all contacts stored within a whisper privileged list located on the sender's computing device 201. In another embodiment, the sender's computing device 201 may transmit a presence request message while the sender composes a message or immediately before sending a message.

In block 310, the recipient's mobile device 106 may receive the presence request message. The recipient's mobile device 106 may determine that the message is a presence request by evaluating any metadata (e.g., header information), by conducting text analysis, or by any other means of classifying received message data. In block 235, the recipient's mobile device 106 may query the status of connected devices. In block 238, the recipient's mobile device 106 may generate a presence update message. In block 240, the recipient's mobile device 106 may transmit the presence update message to the sender's computing device 201. In block 245, the sender's computing device 201 may receive the presence update message from the recipient, for instance from the recipient's mobile device 106.

Figure 6:
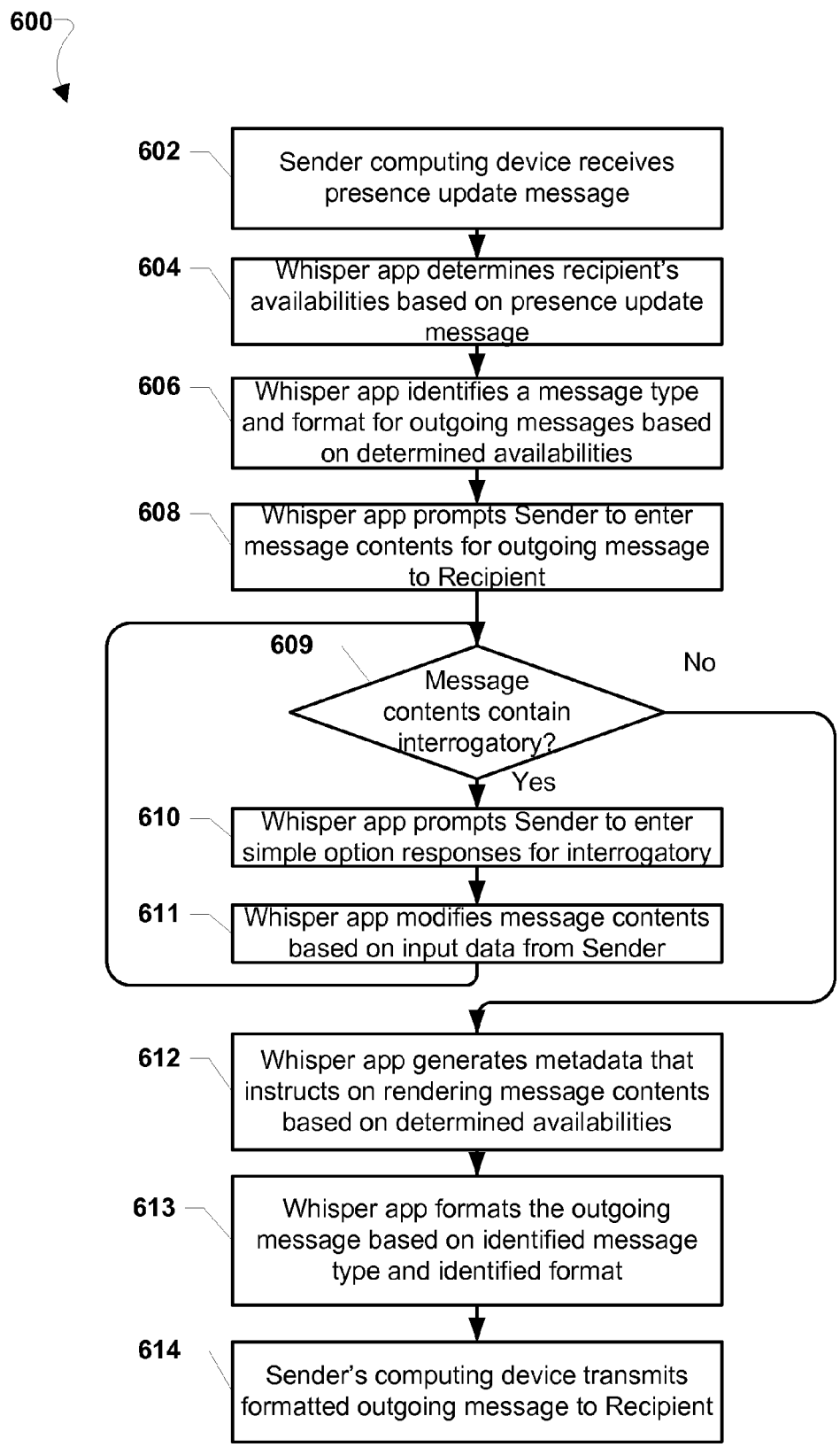
FIG. 6 is a process flow diagram illustrating an embodiment method for generating and formatting a message based on the recipient's status information.

In block 320, the sender's computing device 201 may generate a message based on the presence update message received from the recipient in block 245. For example, the sender's computing device 201 may generate a whisper message to the recipient based on the contents of the received presence update message. In an embodiment, a whisper application (or app) executing on the sender's computing device 201 may parse the presence update message to determine formatting techniques or other message configurations that may capitalize on the recipient's current status (e.g., does the recipient have wireless earpieces equipped, is the recipient's mobile device 106 in silent mode, etc.). FIG. 6 describes in detail how the sender's computing device 201 may use the status information in creating messages.

In block 225, the sender's computing device 201 may transmit the message to the recipient, for example, to the recipient's mobile device 106. In block 230, the recipient's mobile device 106 may receive the message from the sender's computing device 201. In block 250, the senders's message, which was received in block 230, may be rendered on one or more devices based on metadata. In block 252, the recipient's mobile device 106 may generate a delivery confirmation message. In block 255, the recipient's mobile device 106 may transmit the delivery confirmation message to the sender. In block 260, the sender's computing device 201 may receive the delivery confirmation message.

FIG. 4 illustrates an embodiment method 400 that employs a server 401 to store status information. Unlike in the operations in blocks 305-240 in FIG. 3, the sender's computing device 201 may not receive presence update information from the recipient's mobile device 106, but instead receive that information from the server 401. In block 210, the recipient's mobile device 106 may be initialized and connected to recipient devices. In block 235, the recipient's mobile device 106 may query the status of connected devices. In block 238, the recipient's mobile device 106 may generate a presence update message. In block 410, the recipient's mobile device 106 may transmit the presence update message to the server 401. The recipient's mobile device 106 may repeatedly perform the operations in blocks 235-410 as an operational loop. In an embodiment, the recipient's mobile device 106 may transmit presence status update messages to the server 401 at a predefined frequency. For example, a regular report from the recipient's mobile device 106 may provide a real-time (or "heartbeat") presence assessment that the server 401 may maintain. In an embodiment, the recipient's mobile device 106 may automatically transmit presence update messages to the contact within a privilege contact list.

In block 415, the server 401 may store presence update information. For example, the server 401 may store presence update information indicated within presence update messages, which were transmitted by the recipient's mobile device 106 in block 410. In an embodiment, the server 401 may record status information within a relational database and may store subsets of the status information within the presence update message. In an embodiment, the server 401 may update database values in response to receiving the presence update message or, alternatively, may log some or all status information over time. In an embodiment, the server 401 may generate statistical information describing the status information over time. For example, the server 401 may calculate the percentage of time the recipient's mobile device 106 is in silent mode, or how often the recipient's mobile device 106 is connected to a personal hub 102. As another example, the server 401 may track motion data represented in the presence update message and estimate typical motion values based on time of day.

The remainder of method 400 is similar to the operations in method 300. However, in blocks 420-430, the sender's computing device 201 requests and receives presence update messages from the server 401 instead of directly from the recipient's mobile device 106. In block 215, the sender's computing device 201 may select the recipient from a list of contacts. In block 420, the sender's computing device 201, may transmit a presence request message to the server 401. In block 425, the server 401 may receive the presence request message. In block 430, the server 401 may transmit a presence update message to the sender's computing device 201. In block 245', the sender's computing device 201 may receive the presence update message from the server 401. In block 320, the sender's computing device 201 may generate a message based on the presence update message. In block 225, the sender's computing device 201 may transmit the message to the recipient, for example, to the recipient's mobile device 106.

In block 230, the recipient's mobile device 106 may receive the message from the sender's computing device 201. In block 250, the senders's message, which was received in block 230, may be rendered on one or more devices based on metadata. In block 252, the recipient's mobile device 106 may generate a delivery confirmation message. In block 255, the recipient's mobile device 106 may transmit the delivery confirmation message to the sender's computing device 201. In block 260, the sender's computing device 201 may receive the delivery confirmation message.

Figure 5:
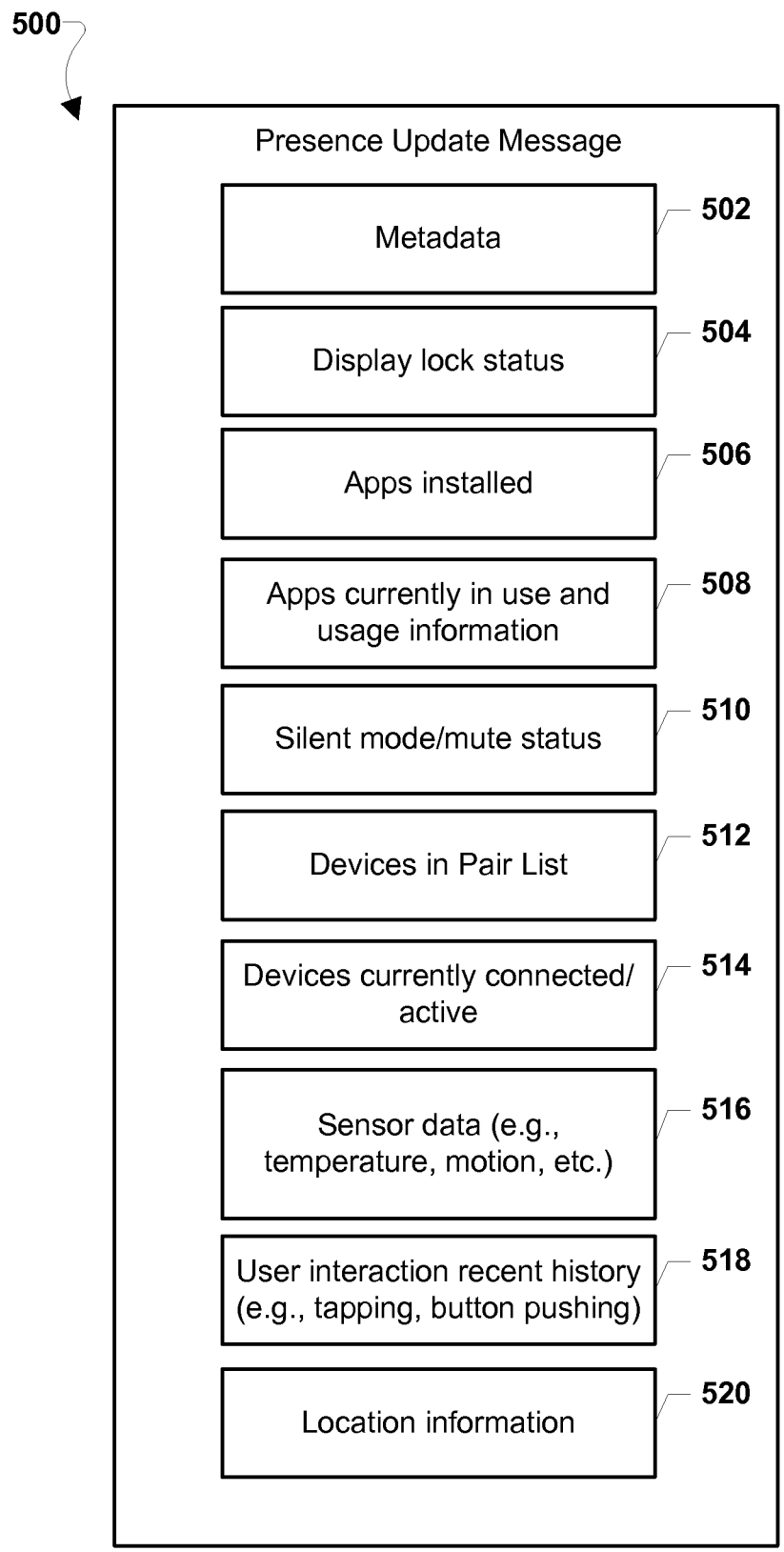
FIG. 5 is a data structure diagram illustrating potential elements of a presence update message.

FIG. 5 illustrates an embodiment data structure within a presence update message 500. The presence update message 500 may be transmitted by the recipient's mobile device to a sender's computing device or a server maintaining up-to-date status information. The presence update message 500 may contain metadata 502, such as formatting information to assist in the rendering using a whisper app. In an embodiment, the metadata 502 may instruct the sender's computing device to display the status information using particular devices. For example, the metadata 502 may direct the smart phone to execute a text-to-speech conversion routine and generate an audio file that may be performed through the sender's personal hub and connected wireless earpiece. In an embodiment, the metadata 502 may provide whisper app instructions that direct the software running on the sender's computing device to adjust system or software variables based on the presence update message 500 contents. For example, the metadata 502 may instruct a whisper app to change default settings for generating new messages.

The presence update message 500 may also contain numerous descriptions of the recipient's mobile device's status at the time the presence update message 500 was created, such as display lock status 504, a list of some or all apps installed 506 on the recipient's smart phone, a list of the apps currently in use and usage information 508 on the recipient's smart phone, and silent mode/mute status 510. The presence update message 500 may further include application data describing the recipient's use of particular applications. For example, the presence update message 500 may contain browser history reports, data entered into online forms, or cookie information.

The presence update message 500 may contain data regarding the various devices associated with the recipient's mobile device, such as a list of some or all devices in a pair list 512 (e.g., devices which have been Bluetooth® paired with the recipient's smart phone). In an embodiment, the presence update message 500 may list some or all of the devices with which the recipient's smart phone has ever paired. The presence update message 500 may contain a list of the devices that are currently connected or active 514, such as a connected personal hub and wireless earpiece. This list may contain information regarding devices that are connected via wired or wireless (e.g., short-range radio) connections. For example, the presence update message 500 may indicate whether wired headphones (or wired headsets or earpieces) are connected to the personal hub or other associated devices.

The various connections between the recipient's mobile device and the associated devices may be indicated in the presence update message 500. For example, the presence update message 500 may indicate that a smart phone is connected via a wire or short-range radio connection to a close personal computer (e.g., a laptop). In general, the connected status of the various devices may indicate the devices' availabilities. For example, when the personal hub is active and wirelessly paired or connected with the recipient's mobile device (e.g., smart phone), the personal hub may be available. In an embodiment, the presence update message 500 may indicate whether any of the associated devices (e.g., personal hub, wireless earpieces, wired headset, etc.) are connected to a power source (e.g., an AC adapter) and/or are being charged. The presence update message 500 may describe the power status of the batteries within the associated devices and may report if a battery within any associated device is "dead". For example, the presence update message 500 may indicate that the personal hub battery is almost out of power. Further information may include sensor data 516, such as temperature data and/or motion data. The sensor data 516 may be retrieved from sensor or measurement units located within the smart phone, personal hub, and wireless earpieces. For example, the recipient's mobile device may retrieve motion data from a connected wireless earpiece containing a gyroscope. As another example, the sensor data 516 may represent motion data from an accelerometer and body temperature measurements from a temperature sensor, both sensors contained within the personal hub. The sensor data 516 may also include temperature measurements from the wireless earpieces which may be used to determine whether the wireless earpieces are being worn. In an embodiment, the presence update message 500 may indicate possible reasons why devices are not being worn, such as indicating that the devices are currently being powered (or charged) via a connection to a power source, are currently malfunctioning (e.g., report software error codes), or redundant because other connected devices are being worn by the user (e.g., wireless earpieces are not worn because a wired headset is connected to the personal hub).

The presence update message 500 may also include data describing the recipient's user interaction recent history 518 with the recipient's mobile device. This user interaction recent history 518 data may include information about the recipient's mobile device's data usage, such as records of data uploaded/downloaded by the smart phone over a period of time, recently used applications, and inputs within various applications (e.g., tapping on a touch screen, pushing device buttons, etc.). For example, the presence update message 500 may include a report of the timestamps of the recent taps on the touch screen.

The presence update message 500 may contain location (or position) information 520 about the recipient, such as GPS coordinates retrieved from a GPS unit within the smart phone. In an embodiment, other data describing the location of the recipient or used to determine a location may be included in the presence update message 500, and may include cell phone tower information (e.g., access records and tower identification information), WiFi access information (e.g., router log information), and IP addresses of the various recipient devices. In an embodiment, the recipient's mobile device may store the presence update message 500 and append the message to other transmissions. For example, the smart phone may insert the information within the presence update message 500 into a delivery confirmation message.

In an embodiment, the presence update message 500 may include information describing the recipient's schedule or itinerary. For example, the recipient's mobile device may access calendar data, stored on the phone or in an accessible online account (e.g., Google calendar, Outlook calendar, etc.), and append the recipient's current activity to the presence update message 500. In an embodiment, the presence update message may contain information about the recipient's mobile device's current cellular network data rate, connectivity to WiFi networks, and any other indicators of data streaming or telephonic availability. In another embodiment, the presence update message 500 may contain information describing the sender's relationship or privileged status with respect to the recipient. The recipient's mobile device may determine the privileged status (e.g., the sender is within the recipient's privileged list, "known," "preferred," "liked," etc.) of the sender (or the sender's computing device) by comparing the sender's ID against data stored within a contact information database, social networking accounts/databases, or other sources that may contain information about the relationship between the recipient and the sender. For example, the presence update message 500 may include an indicator of whether or not the sender is on the recipient's privileged contact list and thereby able to create whisper messages that the recipient's personal hub may render immediately upon receipt. As another example, the presence update message 500 may describe the recipient's current disposition regarding the sender and include text such as, "Recipient is not taking your calls at the moment" or "You have been removed from Recipient's favorites list."

Figure 7:
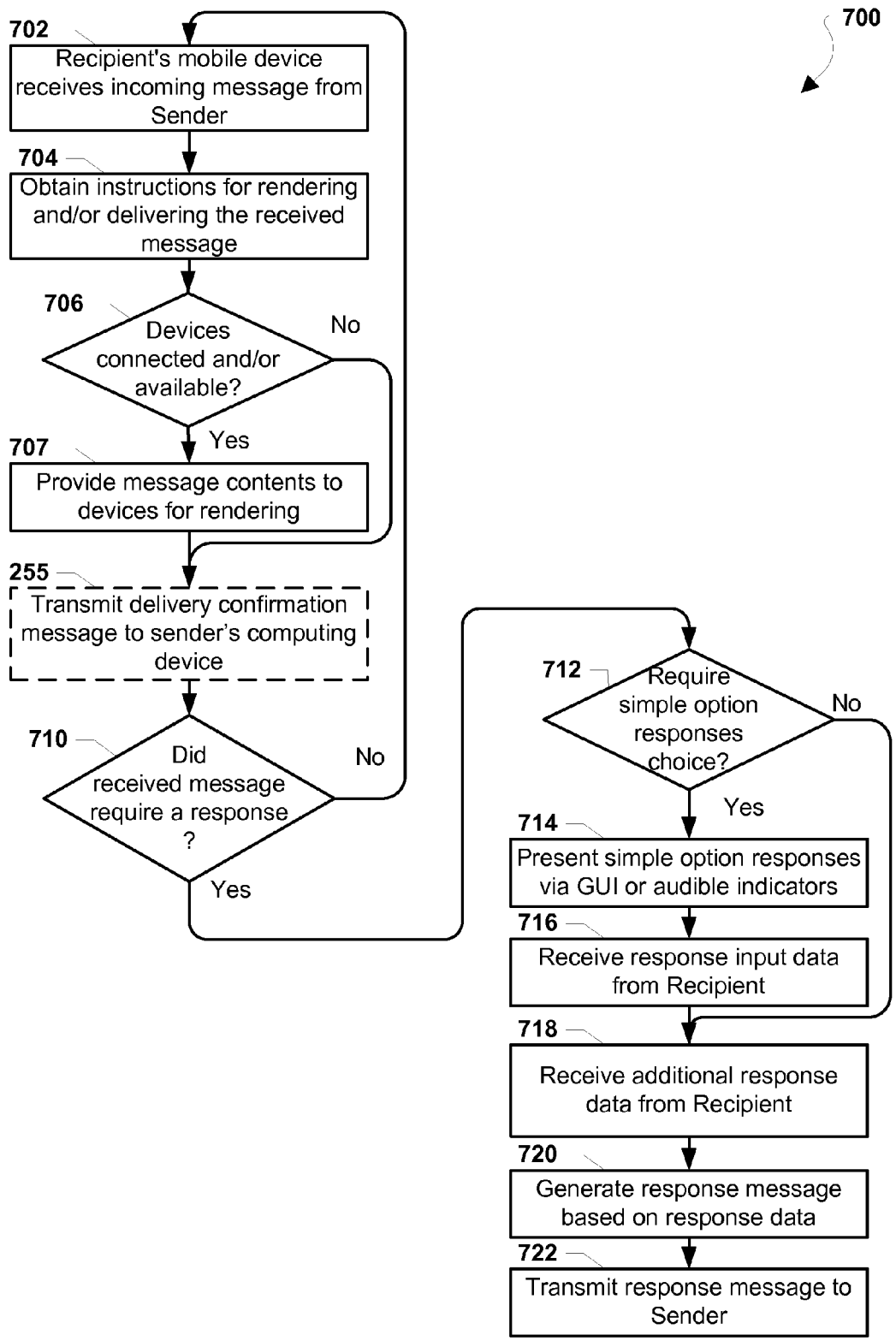
FIG. 7 is a process flow diagram illustrating an embodiment method for a recipient receiving, rendering and responding to a message formatted based on the user's status information.

FIGS. 6-7 illustrate various embodiment methods for generating an outgoing message that includes instructions for rendering message contents on a recipient's mobile device. In the various embodiments, the operations may be performed by various communication devices, such as the devices within the communication system as described above with reference to FIG. 1 (e.g., a smart phone) as well as other computing devices capable of generating messages for delivery to a recipient's mobile device, such as a laptop computer, a central server, and various other computing devices associated with a sender.

An embodiment method may include determining, based on received status information regarding the recipient's mobile device, availabilities of message rendering devices coupled to the recipient's mobile device, identifying a format and a message type for sending the outgoing message to the recipient's mobile device based on the determined availabilities of message rendering devices coupled to the recipient's mobile device, formatting the outgoing message according to the identified format and the identified message type, generating metadata that includes instructions for rendering the outgoing message based on the determined availabilities of message rendering devices coupled to the recipient's mobile device, and transmitting the outgoing message to the recipient's mobile device. In another embodiment, the status information regarding the recipient's mobile device may include at least one of information describing a privileged status, a list of devices connected to the recipient's mobile device, information about recent activities of devices connected to the recipient's mobile device, and sensor data. In another embodiment, the identified message type may be selected from a group that may include of an email, a whisper message, an SMS text message, an audio message, a visual message, a video call, a telephone call, and a message formatted for processing with whisper service software. In another embodiment, the generated metadata that includes instructions for rendering the outgoing message may indicate a device coupled to the recipient's mobile device on which the outgoing message is to be rendered and whether the outgoing message is to be rendered audibly, visually, or tactilely. In another embodiment, the generated metadata that includes instructions for rendering the outgoing message may indicate that a first portion of the outgoing message is to be rendered on a first device connected to the recipient's mobile device and a second portion of the outgoing message is to be rendered on a second device connected to the recipient's mobile device. In another embodiment, the generated metadata that includes instructions for rendering the outgoing message may indicate that a first portion of the outgoing message is to be rendered audibly via a first device connected to the recipient's mobile device and a second portion of the outgoing message is to be rendered visually on a second device connected to the recipient's mobile device. In another embodiment, the generated metadata that includes instructions for rendering the outgoing message may indicate that a vibration motor should be activated when rendering the outgoing message. In another embodiment, identifying a format and a message type for sending the outgoing message to the recipient's mobile device may be include determining whether the outgoing message includes an interrogatory posed by a sender, prompting the sender to provide a set of recipient responses related to the interrogatory when the outgoing message includes the interrogatory, and modifying the outgoing message to include the set of recipient responses based on an input received from the sender. In another embodiment, generating metadata that includes instructions for rendering the outgoing message based on the determined availabilities of message rendering devices coupled to the recipient's mobile device may include generating metadata that indicates that each response in the set of recipient responses is to be rendered differently. In another embodiment, generating metadata that includes instructions for rendering the outgoing message based on the determined availabilities of message rendering devices coupled to the recipient's mobile device may include generating metadata that includes instructions for rendering the set of recipient responses using at least one of large text, small text, colored text, blinking text, animated text, sound rendered on a device coupled to the recipient's mobile device, an image rendered on a device coupled to the recipient's mobile device, and information defined within a configuration file.

FIG. 6 illustrates an embodiment method 600 for a sender's computing device to create formatted messages based on a recipient's status information. As described above, in various embodiments the sender's computing device, such as a smart phone or laptop computer, may request presence update messages directly from the recipient's mobile device or a server maintaining status information for the recipient's mobile device. The sender's computing device may execute a whisper app (or whisper software services) and, based on status information indicated in presence update messages, may generate messages that direct the recipient's mobile device and associated devices (e.g., personal hub, wireless earpiece, etc.) to render the messages in a convenient and effective manner. In various embodiments, the whisper app may be installed and the operations in method 600 may be performed by the sender's computing device or any other computing device wired or wirelessly connected to the phone, such as a personal hub, a laptop computer, a wireless earpiece, a tablet device, etc.

In block 602, the sender's computing device may receive a presence update message. For example, the sender's computing device may receive a presence update message that includes status information of devices currently connected to the recipient's smartphone. In block 604, the whisper app may determine the recipient's availabilities based on status information in the presence update message. In other words, the whisper app may create availability conclusions that indicate the availability of devices associated with the recipient to render message contents. For example, the whisper app, running on the processor of the sender's computing device, may interpret presence or status information indicated within the received presence update message and may determine availabilities of the recipient. Availabilities (or availability conclusions) may be codes, classifications, or categories that define the ability of the recipient to receive and interact with various forms of communications (i.e., status information). In particular, the availabilities may be based on the connectivity of the recipient's devices (e.g., personal hub, wireless earpieces, etc.) For example, the whisper app may conclude that the recipient is fully available for an interactive audio message, as the recipient's smart phone browser app is active and his personal hub and wireless earpiece are both connected. As another example, the whisper app may conclude that the recipient has limited availability, as his wireless earpiece microphone is configured to a mute setting, but his personal hub is active. As another example, the status information may indicate that the sender is within a privileged list of the recipient's and may transmit whisper messages.

The whisper app may parse the presence update message into discrete data elements and evaluate the variables singularly or in combination. For example, the whisper app may interpret motion data reported from an accelerometer within a personal hub of the recipient and conclude that the recipient is active. As another example, the whisper app may conclude that the recipient is asleep based on static motion data, a report that the personal hub and a wireless earpiece are equipped, an active screen saver application on the recipient's mobile device, and data use records that show no use for a long period. In an embodiment, the whisper app may determine availabilities (or availability conclusions) based on a rule-based system that may or may not use dependency relationships between various presence variables.

In an embodiment, the whisper app may weigh certain presence variables differently than others when determining availabilities. For example, motion data from the recipient's personal hub may be weighed as more important than the activity of a phone display lock. In an embodiment, the whisper app may utilize sender configuration files to determine the weight or importance of various presence variables. In an embodiment, the whisper app may utilize threshold variables and/or values to determine the recipient's availability. For example, the whisper app may only determine the recipient is fully available if motion data retrieved from the recipient's mobile device accelerometer represents moderate activity.

In an embodiment, the presence update message may contain recipient availability conclusions conducted by whisper app services on the recipient's mobile device prior to transmission of the presence update message. For example, the recipient's mobile device may evaluate the recipient's various devices, determine presence variables, and conclude that the recipient has low availability as he is in a meeting.

In block 606, the whisper app may identify a message type and format for outgoing messages based on the determined availabilities. For example, the whisper app may identify a certain message format and/or message type recommended to be used for messages to the recipient based on availability conclusions. In an embodiment, based on the availabilities, the whisper app may identify (or recommend) a particular type of transmission. For example, the whisper app may suggest that the recipient is most available to receive an SMS message as the recipient's personal hub is not currently connected to the recipient's smart phone. The whisper app may identify and/or recommend other message types, such as email, whisper messages, SMS text messages, audio messages, visual messages, video calls, telephone calls, and messages formatted for processing with whisper service software. The whisper app may also identify a recommended message format or content guidelines for transmissions based on the determined availabilities. For example, as the recipient has limited data availability due to a low reported data rate, the whisper app may identify that the sender should transmit a short text instead of an email with large attachments.

In an embodiment, the whisper app may render a graphical dialog window on the sender's computing device which displays identified message and format recommendations. In another embodiment, the whisper app may allow the sender to accept or reject recommendations. For example, the sender may not choose to follow the whisper app's identified recommended message type of a whisper message instead of an email message. In an embodiment, the whisper app may automatically impose formatting and message type limitations on the sender based on the determined availabilities. For example, after interpreting the recipient's availability as minimal due to a reported calendar entry of a meeting at the current time and a recipient status message of "Do Not Disturb," the whisper app may disallow the creation of a whisper audio message.

In an embodiment, if the sender desires to transmit a message including an interrogatory (or question) for the recipient, the whisper app may identify formatting for rendering the message as a selection list. For example, if the determined availabilities describe the recipient as unable to provide a long response, the whisper app may prompt the sender to create a simple question message with a set of responses from which the recipient may choose using his smart phone, personal hub, or other connected devices, such as wireless earpieces. In an embodiment, the whisper app may prompt the sender to input whether a transmission requires a binary response from the recipient (i.e., 'yes' or 'no'). In an embodiment, the whisper app may prompt the sender to provide other formatting aspects to messages, such as optional text effects (e.g., small text, large text, blinking text, animated text, bold text, colored text, etc.), whether a response is audible (e.g., a sound response), and whether a response is to be rendered from a particular output device associated with the recipient's mobile device (e.g., a visual response displayed on the recipient's personal hub, an audible response rendered on an earpiece device, etc.). In an embodiment, the whisper app may prompt the sender to use a predefined or template format for the message (e.g., a format or other information defined within a configuration file or user preference file).

In block 608, the whisper app may prompt the sender to enter message contents for an outgoing message to the recipient. For example, the sender may provide message contents, such as statements, comments, and interrogatories (or questions). In an embodiment, the whisper app may render a series of questions to the sender on the sender's computing device which prompts the sender to enter information. For example, the whisper app may display questions, such as "Do you want to make a statement or pose a question to the recipient?" The whisper app may render graphical user interface buttons with which the sender may interact to proceed through the app's prompts. In an embodiment, the whisper app may open new applications for message contents input by the sender based on responses to prompts. For example, the whisper app may indicate that the recipient is best available on email or SMS text, provide the sender with a GUI button for each, and open either an email composition form or SMS text form based on the sender's input.

In an embodiment, the whisper app may evaluate the message contents and determine the likelihood that the recipient will be available based on the determined availabilities (e.g., availability conclusions and status information). For example, the whisper app may determine a low likelihood that a long email having questions for the recipient to answer will be responded to based on status information which describes the recipient as driving a car. In an embodiment, the whisper app may indicate likelihood determinations to the sender and may display alternatives to increase the likelihood of response by the recipient. For example, the whisper app may prompt the sender to simplify existing text, change the mode of transmission (e.g., from email to SMS text message or whisper message), or change the format of the message.

In determination block 609, the whisper app may determine whether the message contents contain an interrogatory. In other words, the whisper app may determine whether the sender is posing a question within the message contents to be answered by the recipient. In an embodiment, the whisper app may detect question marks text symbols or question phrasing using natural language processing. If the message contents contain an interrogatory (i.e., determination block 609="Yes"), in block 610, the whisper app may prompt the sender to enter simply response options for the interrogatory. In other words, the sender may be prompted to provide responses the recipient can choose to answer the interrogatory. For example, if the sender wants to send the recipient a question "What do you want for dinner?," the whisper app may prompt the sender to input a set of possible responses, such as "Steak" and "Sushi."

In block 611, the whisper app may modify the message contents based on received input data from the sender. In other words, the whisper app may modify the outgoing message to include a set of possible recipient responses to the interrogatory received from the sender in response to prompting. For example, the sender may input text data that represents a simple response option (e.g., "yes," "no," "steak," "sushi," etc.). In an embodiment, the whisper app may also record instructions that may be executed by the recipient's mobile device or personal hub if the recipient selects a particular simple response option. For example, the whisper app may record in a metadata instruction that if the recipient selects a particular response, then the recipient's mobile device may transmit a particular response transmission. As further example, the metadata may direct the recipient's mobile device running the whisper app to generate and transmit an SMS text message to the sender's computing device if the recipient's personal hub detects a particular recipient response. Once the response values for the interrogatory are received from the sender, the whisper app may continue with the operations in determination block 609. For example, the whisper app may determine whether another interrogatory is within the message contents and thus additional response values may be received.

If the message contents do not contain an interrogatory (i.e., determination block 609="No") or if the sender has provided simple response options for interrogatories within the message, in block 612 the whisper app may generate metadata that includes instructions for rendering the message contents based on determined availabilities. In other words, the metadata may include instructions indicating how the recipient's mobile device and connected devices may render the sender's outgoing message. The metadata may be code or other information that is inserted within, intermixed, and/or surrounding message contents. In an embodiment, the metadata may be readable by other whisper app implementations (e.g., on the recipient's mobile device) and may direct a particular device to render the message contents according to the sender's specifications or the limitations defined by the determined availabilities. For example, metadata may indicate different simple response options related to an interrogatory and may include instructions to render each simple response option differently (e.g., one on the left, one on the right, one loud, one soft, etc.). As another example, the metadata may direct a left earpiece to render a particular portion of the message contents. In an embodiment, the metadata may indicate whether the sender's outgoing message and/or its message contents should be rendered by the recipient's devices audibly, visually, or tactilely. For example, the metadata may direct the whisper app running on the recipient's mobile device to play audio in a wireless earpiece. As another example, the metadata may cause an audible beep at the recipient's personal hub upon receipt of a whisper message, email, or an SMS message. As yet another example, the metadata in the outgoing message may direct the recipient's mobile device, personal hub, and/or other connected device to vibrate or generate other haptic feedback (e.g., a vibration motor may be activated).

In an embodiment, the generated metadata may include instructions that direct different devices connected to the recipient's mobile device to render different portions of the message contents. For example, the metadata may instruct a first portion to be rendered on a first device connected to the recipient's mobile device and a second portion to be rendered on a second device connected to the recipient's mobile device. In another embodiment, the metadata may instruct a device In an embodiment, the generated metadata may include instructions that direct one (or more) devices connected to the recipient's mobile device to render portions of the message contents in different manners. For example, the metadata may instruct a wireless earpiece connected to the recipient's mobile device to render a first portion audibly via and may also instruct a personal hub device to render a second portion visually. The metadata may further include formatting or rendering instructions, such as whether to render message contents as large text, small text, colored text, blinking text, animated text, sound, an image, and/or using information defined within a configuration file (e.g., a preferred format, etc.).

In block 613, the whisper app may format the outgoing message based on the identified message type and identified format. In an embodiment, the outgoing message may also be formatted using the generated metadata. In block 614, the sender's computing device may transmit the formatted outgoing message to the recipient, for instance to the recipient's mobile device. In an embodiment, the metadata may describe the message contents with a category description (e.g., question, statement, audio, whisper message, etc.).

FIG. 7 illustrates an embodiment method 700 for a recipient's mobile device, personal hub, and wireless earpieces receiving, rendering and responding to a message formatted based on the recipients status information. The mobile device may be a laptop computer, smart phone, tablet device, and other similar computing devices. In various embodiments, any of the mobile device, personal hub, or the wireless earpieces may perform the following operations for processing received whisper messages and may each execute software capable of processing whisper messages, such as a whisper app.

In block 702, the recipient's mobile device may receive an incoming message from a sender, for instance from a sender's computing device. For example, via a cellular network, the recipient's mobile device may receive a whisper message, visual message, telephone call, or other audio message.

In block 704, the recipient's mobile device may obtain instructions for rendering and/or delivering the received message. In particular, the recipient's mobile device may determine whether the received message includes metadata, such as generated by a whisper app or whisper software running on the sender's computing device. For example, the recipient's mobile device may decode, parse and evaluate header information or other encoding information within the received message to obtain metadata, formatting data, message contents, and/or rendering instructions.

The recipient's mobile device may obtain instructions (e.g., metadata) that indicate instructions for delivering message contents to devices connected to the recipient's mobile device (e.g., output devices such as wireless earpieces, etc.). For example, detected metadata may include instructions for the recipient's mobile device to forward audio to a connected output device (e.g., the recipient's wireless earpiece). As another example, metadata may instruct a certain portion of the message contents to be performed as audio in a right wireless earpiece connected to the recipient's mobile device and another portion to be rendered as visual information on a connected personal hub device. The received message may also contain instructions that indicate formatting instructions for various portions of the received message. For example, metadata may include instructions for the recipient's mobile device to forward text-to-speech audio from one part of the received message to the recipient's left wireless earpiece and text-to-speech audio from another part of the message to the right wireless earpiece. As another example, metadata may indicate that certain text should be rendered in a certain color or as an animation. In an embodiment, metadata may also contain instructions directing the recipient's mobile device, personal hub or wireless earpieces to replay audio a certain number of times, slow down audio playbacks, increase the volume in certain sections of audio playbacks, and other effects.

In an embodiment, the received message may not contain metadata. In such a case, the received message may be handled by the recipient's mobile device in conventional manners (e.g., leave SMS text messages as unread and stored on the smart phone, send audio messages to voice mail, etc.). In an embodiment, the recipient's mobile device may interpret the received message's message type, and contents, and deliver the received message to various output devices, such as the personal hub and wireless earpieces, for rendering without metadata. For example, the recipient's mobile device may determine that a received message which does not have metadata is a text message from a contact on the recipient's privileged list and may render the message as audio for playing through the wireless earpieces.

In determination block 706, the recipient's mobile device may determine whether devices are connected and/or available. In particular, the recipient's mobile device may determine whether output devices indicated in obtained instructions or metadata of the received message are connected to the recipient's mobile device and/or available for receiving and rendering message contents. For example, when metadata of the received message indicates particular message contents are to be rendered as audio by a wireless earpiece, the recipient's mobile device may determine whether the wireless earpiece is wirelessly connected (or paired) with the recipient's mobile device. In an embodiment, the recipient's mobile device, the personal hub, or any other computing device employed by the recipient may detect whether output devices are connected based on operations similar to those for determining status information as described above with reference to FIG. 5. For example, the recipient's mobile device may determine whether the personal hub is active and wirelessly paired such that the personal hub is available for rendering message contents.

If devices are connected and/or available (i.e., determination block 706="Yes"), in block 707 the recipient's mobile device may provide message contents to the devices for rendering. The recipient's mobile device may provide, transfer, and/or otherwise deliver message contents based on the obtained instructions (e.g., metadata) within the received message. For example, sound or visual message contents may be provided (or delivered) to a right wireless earpiece for rendering based on metadata within the received message. As another example, an instruction for a motor to generate a vibration may be transmitted to the personal hub. In an embodiment, the personal hub may receive the contents and instructions for delivery to wireless earpieces. The personal hub may execute obtained instructions in ways that include transferring data to wireless earpieces for playback, rendering messages on the display unit of the personal hub, activating vibrations within the personal hub and/or wireless earpiece devices, polling sensor units, etc. In an embodiment, the instructions may direct the personal hub to transmit the data to the earpieces at particular moments. For example, the personal hub may schedule data transmissions to the left wireless earpiece before transmissions to the right earpiece. In an embodiment, the recipient's mobile device, the personal hub, or any other computing device employed by the recipient may provide message contents to a subset of the output devices indicated in the obtained instructions or metadata based on the devices' availability (or connectivity) at the time of receipt of the received message. For example, if metadata indicates message contents are to be rendered by two separate wireless earpieces and only one earpiece is connected to the recipient's mobile device, the recipient's mobile device may provide contents to the one connected wireless earpiece.

If the device are not connected or available (i.e., determination block 706="No") or if message contents have been provided to the devices, in optional block 255 the recipient's mobile device may transmit a delivery confirmation message to the sender's computing device as described above in reference to FIG. 2.

In determination block 710, the recipient's mobile device may determine whether the received message requires a response. In an embodiment, metadata may indicate a category describing the received message as containing an interrogatory (or question) for the recipient to answer. In another embodiment, the recipient's mobile device may analyze text or audio data within the received message to determine whether an interrogatory is posed. For example, the recipient's mobile device may execute a pattern matching routine to find well-known interrogatory patterns or symbols, such as a question mark. If the recipient's mobile device determines that the received message did not require a response (i.e., determination block 710="No"), then the method 700 may continue with the operations in block 702.

If the recipient's mobile device determines that the received message did require a response (i.e., determination block 712="Yes"), in determination block 712, the recipient's mobile device may determine whether the interrogatory requires a simple response options choice. For example, the interrogatory may include a set of simple responses the sender indicated within the message that the recipient may choose between to respond. In other words, the recipient's mobile device may determine whether the message contents and metadata indicate appropriate ways to present the question to the recipient using the personal hub and wireless earpieces. The recipient's mobile device may analyze metadata within the received message to detect simple response options, such as 'yes' or 'no'. For example, the metadata may contain a code or identifying information that marks the message as having simple response options. In an embodiment, the recipient's mobile device may analyze the text or audio of the received message to determine the message contains simple response options.

If the recipient's mobile device determines the interrogatory requires a simple response options choice (i.e., determination block 712="Yes"), in block 714 the recipient's mobile device may present simple response options via graphical user interface or audible indicators. In an embodiment, the recipient's mobile device may transmit instructions based on metadata in the received message to the various connected devices (e.g., earpiece devices, personal hub, etc.) to render these simple response options to the recipient. Instructions for simple response options may include the personal hub displaying large text response options (e.g., 'yes'/'no', "steak"/ "sushi", etc.), displaying differently colored response options, showing options as blinking or static text, playing response options in a particular wireless earpiece (e.g., 'yes' audio is played in the right wireless earpiece and 'no' audio is played in the left wireless earpiece), and the like. In an embodiment, the metadata may direct the recipient's mobile device to query recipient user configuration files to determine how to instruct the various devices to display or render simple response options. For example, the recipient may have a presets configuration file that informs the recipient's mobile device to direct all 'yes' response options to the recipient's left wireless earpiece and 'no' response options to the right earpiece.

In block 716, response input data may be received from the recipient. In other words, the personal hub, wireless earpieces, and other devices connected to the recipient's mobile device may receive input data from the recipient indicating a choice of presented simple response options. Response input data may include graphical user interface input (e.g., selections on a graphical user interface button, etc.) and/or sensor data received from a sensor within a device connected to the recipient's mobile device (e.g., an accelerometer, a touch sensor, a gyroscope, and/or a magnetometer within a wireless earpiece, etc.). For example, the left wireless earpiece may detect an abrupt motion measurement using an on-board gyroscope and wirelessly transmit this motion data to the personal hub which may in turn recognize that the recipient tapped the left wireless earpiece to indicate selection of the response option played there. As another example, the personal hub may detect recipient touch input on the side of the display unit which corresponds to an response option. As another example, the recipient may provide different input responses by tapping on the left wireless earpiece, tapping on the right wireless earpiece, tapping on both wireless earpieces simultaneously, and tapping on either while tapping on the graphical user interface of the personal hub or smart phone. In an embodiment, the recipient's mobile device may determine a response by the user not providing input (e.g., tapping, swiping, talking, etc.) within a certain period of time. In another embodiment, wireless earpieces, the personal hub, and/or the recipient's mobile device may include microphones configured to receive audio inputs from the recipient. For example, when the recipient taps or strikes a wireless earpiece that includes a microphone, that microphone may detect the sound of the tap or strike and the wireless earpiece may interpret a corresponding microphone signal as an input (e.g., a tap input to select a simple option rendered through the corresponding wireless earpiece, etc.).

In an embodiment, the recipient's mobile device may send an audio or text message (e.g., SMS, whisper message, etc.) to the sender's computing device, execute other software, or establish a phone conversation in response to the recipient not selecting a simple response option. For example, if the recipient's mobile device does not receive a simple response option within a certain period of time or if it detects audio input data indicating the simple response options are inadequate (e.g., the recipient says into the wireless earpiece microphone "call him!"), the recipient's mobile device may initiate a phone call or transmit a whisper message.

In block 718, if the received message did not require a simple response option choice (i.e., determination block 712="No") or the recipient provided input indicating a choice (or a selection) of a simple response option, the recipient's mobile device may receive additional response data from the recipient. For example, the recipient's mobile device may receive one or more of a graphical user interface or button input (e.g., typing words, numbers, etc.), speech-to-text input, and/or other information the recipient wants to include in a response to the sender. In an embodiment, the recipient's mobile device may receive audio input from the recipient for dictation to an email, whisper message, or SMS text message.

In the various embodiments, the smart phone, personal hub, and other connected devices may receive input data from the recipient in the form of movement data (e.g., tapping, striking, swiping, etc.), audio data (e.g., recipient verbally responds to a question), or entered text responses.

In block 720, the recipient's mobile device may generate a response message based on response data. For example, the recipient's mobile device may package any received responses or input data (e.g., text message for the sender, etc.) into an outgoing response message to be sent to the sender's computing device. The response message may be formatted in a similar manner as the operations described above with reference to FIG. 6. In block 722, the recipient's mobile device may transmit the response message to the sender's computing device.

Figure 8:
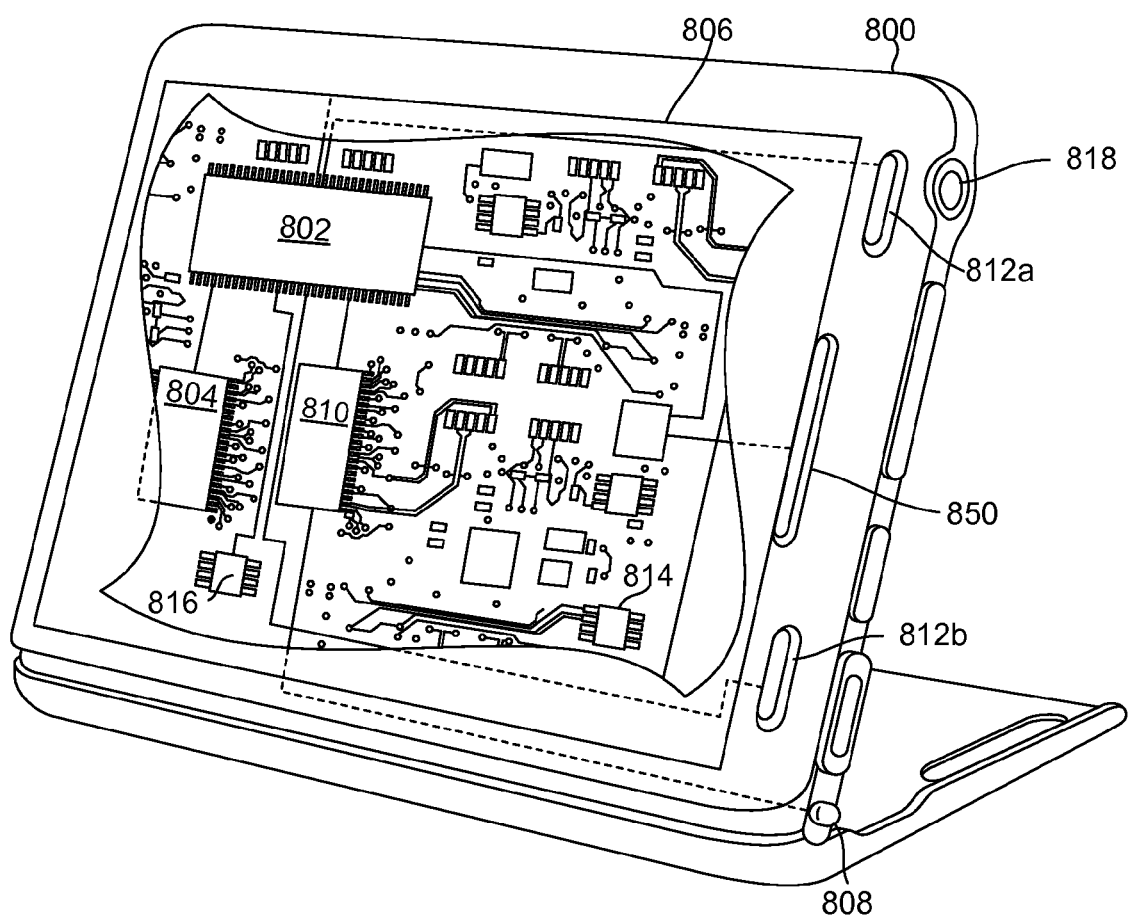
FIG. 8 is a component diagram of an example mobile device suitable for use with the various embodiments.

The various embodiments may be implemented in any of a variety of mobile devices, an example of which is illustrated in FIG. 8. For example, the mobile device 800 may include a processor 802 coupled to internal memories 804 and 810. Internal memories 804 and 810 may be volatile or non-volatile memories, and may also be secure and/or encrypted memories, or unsecure and/or unencrypted memories, or any combination thereof. The processor 802 may also be coupled to a touch screen display 806, such as a resistive-sensing touch screen, capacitive-sensing touch screen infrared sensing touch screen, or the like. Additionally, the display of the mobile device 800 need not have touch screen capability. Additionally, the mobile device 800 may have one or more antenna 808 for sending and receiving electromagnetic radiation that may be connected to a wireless data link and/or cellular telephone transceiver 816 coupled to the processor 802. The mobile device 800 may also include physical buttons 812*a* and 812*b* for receiving user inputs. The mobile device 800 may also include a power button 818 for turning the mobile device 800 on and off. In various embodiments, the mobile device 800 may also include a microphone 850 connected to the processor 802 to receive an audio input.

Figure 9:
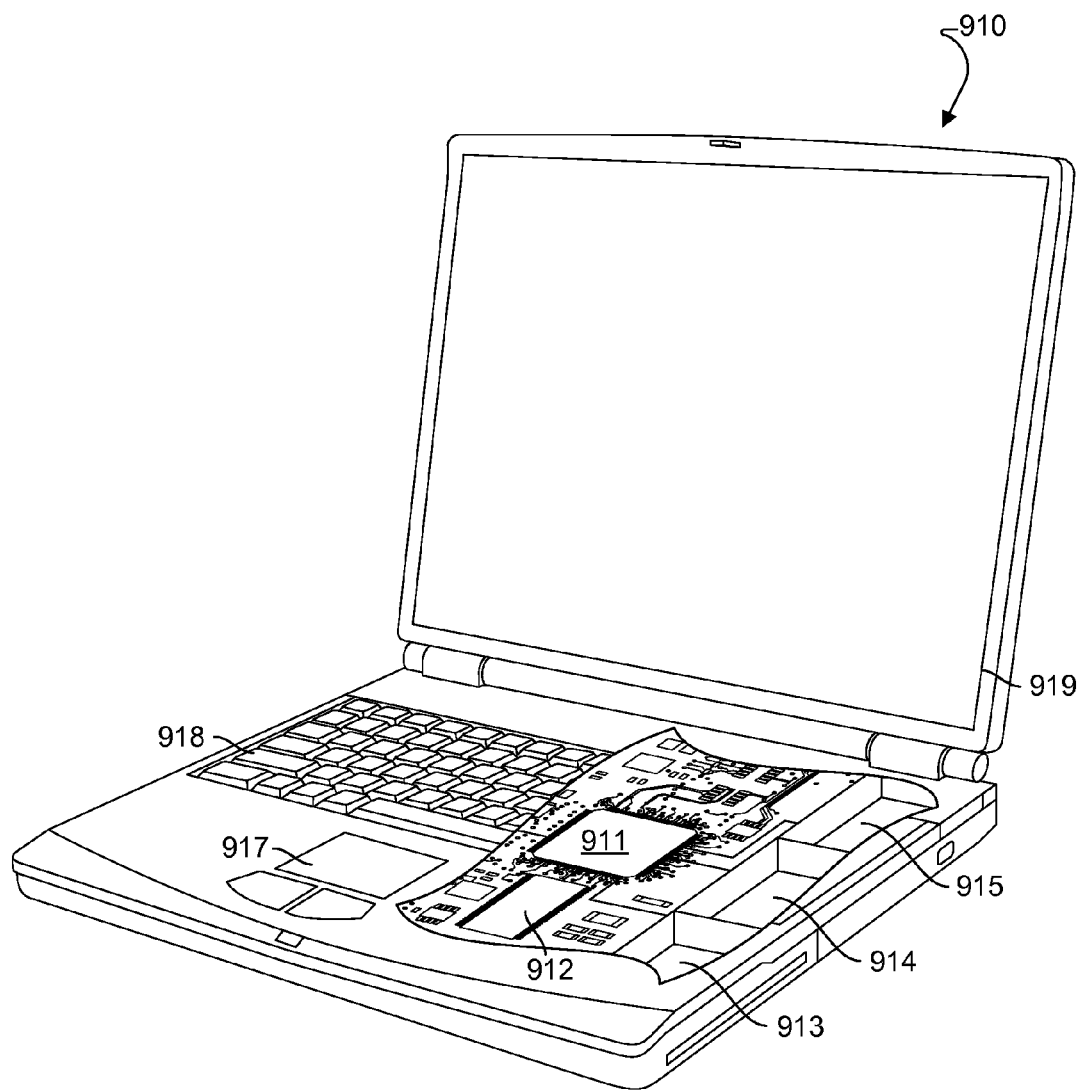
FIG. 9 is a component diagram of another example mobile device suitable for use with the various embodiments.

The various embodiments described above may also be implemented within a variety of personal computing devices, such as a laptop computer 910 as illustrated in FIG. 9. Many laptop computers include a touch pad touch surface 917 that serves as the computer's pointing device, and thus may receive drag, scroll, and flick gestures similar to those implemented on mobile devices equipped with a touch screen display and described above. A laptop computer 910 will typically include a processor 911 coupled to volatile memory 912 and a large capacity nonvolatile memory, such as a disk drive 913 of Flash memory. The laptop computer 910 may also include a floppy disc drive 914 and a compact disc (CD) drive 915 coupled to the processor 911. The laptop computer 910 may also include a number of connector ports coupled to the processor 911 for establishing data connections or receiving external memory devices, such as a USB or FireWire® connector sockets, or other network connection circuits for coupling the processor 911 to a network. In a notebook configuration, the computer housing includes the touch pad touch surface 917, the keyboard 918, and the display 919 all coupled to the processor 911. Other configurations of the computing device may include a computer mouse or trackball coupled to the processor (e.g., via a USB input) as are well known, which may also be use in conjunction with the various embodiments.

Figure 10:
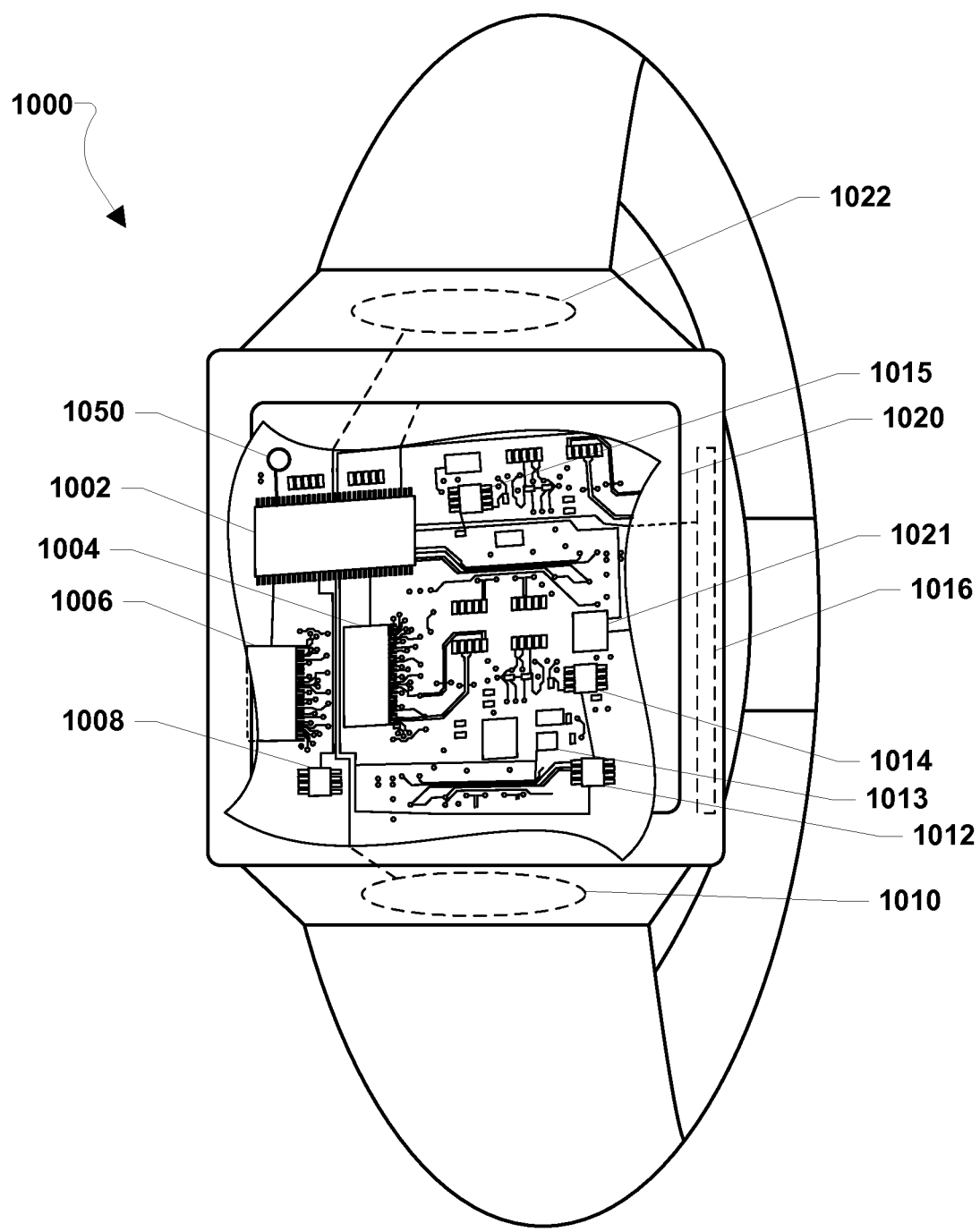
FIG. 10 is a component diagram of a personal hub suitable for use with the various embodiments.

The various embodiments described above may also be implemented within a variety of personal hubs, such as a wrist watch type personal hub 1000 as illustrated in FIG. 10. A personal hub 1000 may include a processor 1002 coupled to internal memories 1004 and 1006. Internal memories 1004 and 1006 may be volatile or non-volatile memories, and may also be secure and/or encrypted memories, or unsecure and/or unencrypted memories, or any combination thereof. The processor 1002 may also be coupled to a touch screen display 1020, such as a resistive-sensing touch screen, capacitive-sensing touch screen infrared sensing touch screen, or the like. Additionally, the personal hub 1000 may have one or more antenna 1008 for sending and receiving electromagnetic radiation that may be connected to a wireless data link and coupled to the processor 1002. The personal hub 1000 may also include physical buttons 1022 and 1010 for receiving user inputs as well as a slide sensor 1018 for receiving user inputs. The personal hub 1000 may also include a vibratory motor 1021 coupled to the processor 1002 to enable the personal hub 1000 to vibrate. The personal hub 1000 may also include various environment sensors or a sensor pack which may include sensor, such as a temperature sensor 1014, an accelerometer 1012, a touch sensor 1015, and a gyroscope 1013 coupled to the processor 1002. In an embodiment, the personal hub 1000 may also include a microphone 1050 coupled to the processor 1102 to receive an audio input.

Figure 11A:
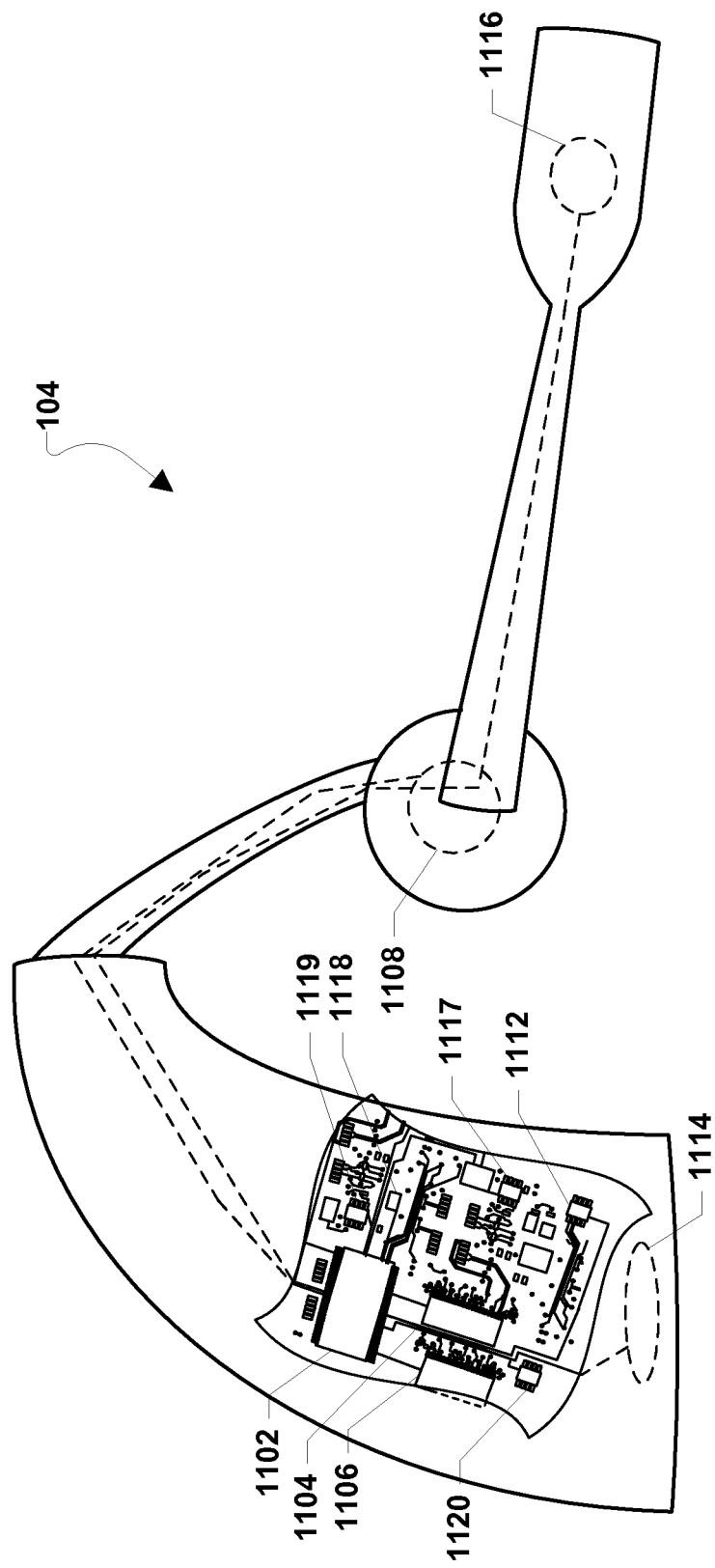
FIGS. 11A-11B are component diagrams of wireless earpieces suitable for use with the various embodiments.

The various embodiments described above may also be implemented within a variety of wireless earpieces, such as a wireless earpiece 104 as illustrated in FIG. 11A. A wireless earpiece 104 may include a processor 1102 coupled to internal memories 1104 and 1106. Internal memories 1104 and 1106 may be volatile or non-volatile memories, and may also be secure and/or encrypted memories, or unsecure and/or unencrypted memories, or any combination thereof. The wireless earpiece 104 may include a physical button 1114 for receiving user inputs. Additionally, the wireless earpiece 104 may have one or more antenna 1112 for sending and receiving electromagnetic radiation that may be connected to a wireless data link and coupled to the processor 1102. The wireless earpiece 104 may include a speaker 1108 coupled to the processor 1102 and configured to generate an audio output. The wireless earpiece 104 may also include a microphone 1116 coupled to the processor 1102 to receive an audio input. The wireless earpiece 104 may also include various environment sensors or a sensor pack which may include sensors, such as a temperature sensor 1117, an accelerometer 1118, a touch sensor 1120, and a gyroscope 1119 coupled to the processor 1102.

Figure 11B:
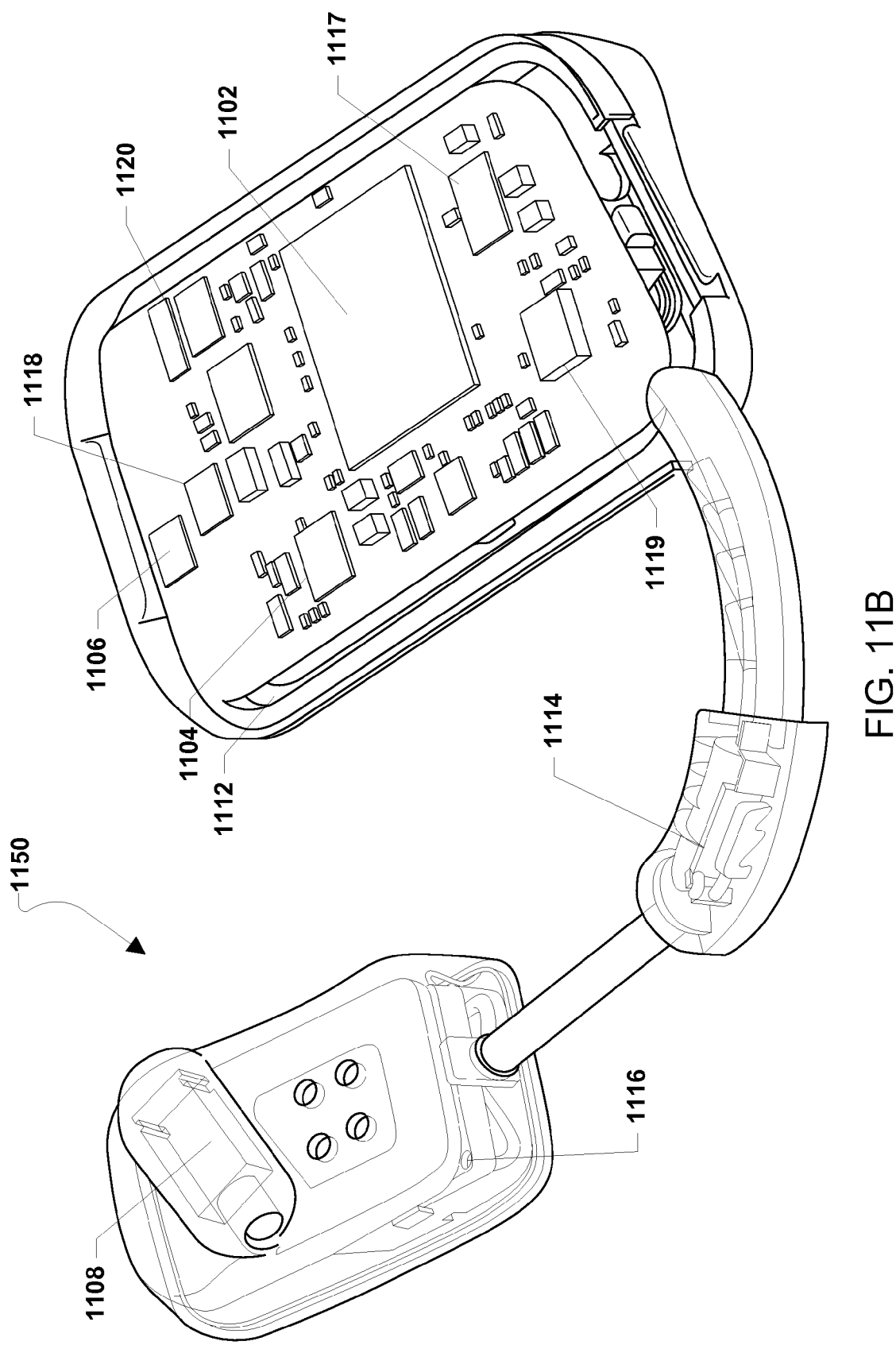

FIG. 11B illustrates an alternative embodiment of the wireless earpiece 1150 in which the microphone 1116 may be positioned within a main housing of the wireless earpiece 1150 rather than on a microphone boom extending toward the user's mouth when the wireless earpiece 1150 is worn. In an embodiment, the microphone 1116 may be a directional microphone, and the earpiece housing may be configured such that the microphone 1116 is pointed toward the mouth of the user when the user may be wearing the wireless earpiece 1150. Further audio processing of microphone data may be used to further direct the microphone sensitivity in order to capture audio data from the user's mouth. In this manner, the microphone 1116 may receive audio input from the user of the wireless earpiece 1150.

The processors 802, 911, 1002, and 1102 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 804, 810, 912, 913, 1004, 1006, 1104, and 1106 before they are accessed and loaded into the processors 802, 911, 1002, and 1102. The processors 802, 911, 1002, and 1102 may include internal memory sufficient to store the application software instructions. In many devices the internal memory may be a volatile or nonvolatile memory, such as flash memory, or a mixture of both. For the purposes of this description, a general reference to memory refers to memory accessible by the processors 802, 911, 1002, and 1102 including internal memory or removable memory plugged into the device and memory within the processor 802, 911, 1002, and 1102 themselves.

In further embodiments, the communications between a personal hub, smart phone, laptop, and/or earpiece may be transmitted over wired data links or combinations of wired and wireless data links. In these embodiments, an example of which is illustrated in FIG. 1 discussed below, two or more of the personal hub, smart phone, laptop, and earpiece may be connected by various cables instead of, or in addition to, wireless data links. In such embodiments, the personal hub may be worn or carried by a user and may interact with a variety of mobile devices and/or accessories through wired connections, or combinations of wired and wireless connections, such as wired headphones, wireless headsets, wired earpieces, etc.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for communicating delivery confirmation information related to received messages by a recipient's mobile device, the method comprising:
   receiving a message in the recipient's mobile device identifying a device coupled to the recipient's mobile device via a short-range wireless communication technology;
   obtaining from the received message instructions for rendering the received message on at least one of the recipient's mobile device or the device coupled to the recipient's mobile device via the short-range wireless communication technology, wherein obtaining from the received message instructions for rendering the received message on at least one of the recipient's mobile device or the device coupled to the recipient's mobile device via the short-range wireless communication technology includes decoding the received message to obtain metadata indicating the device on which the sender desires the received message to be rendered and at least one of sound or visual message contents;
   determining whether the device indicated in the metadata is coupled to the recipient's mobile device via the short-range wireless communication technology;
   providing the at least one of sound or visual message contents to the device indicated in the metadata in response to determining that the device is coupled to the recipient's mobile device;
   generating a delivery confirmation message reporting whether the received message was delivered and, if the received message was delivered, a manner in which the received message was delivered; and
   transmitting the delivery confirmation message to a sender of the received message.

2. The method of claim 1, wherein reporting the manner in which the received message was delivered includes reporting information describing at least one of an identity of the device coupled to the recipient's mobile device, a first indicator of whether message contents of the received message were successfully rendered by the device coupled to the recipient's mobile device, or a second indicator of whether message contents of the received message were queued for rendering by the device coupled to the recipient's mobile device.

3. The method of claim 1, wherein receiving the message in the recipient's mobile device comprises receiving at least one of an email, a whisper message, an SMS text message, an audio message, a visual message, a video call, a telephone call, or a message formatted for use with whisper software.

4. The method of claim 1, further comprising:
   receiving input data from at least one of the recipient's mobile device and or the device coupled to the recipient's mobile device in response to delivering the received message; and
   generating the delivery confirmation message based on the received input data.

5. The method of claim 4, wherein receiving input data comprises receiving sensor data at least from one of:
   a touch sensor;
   an accelerometer;
   a gyroscope; or
   a magnetometer.

6. A computing device comprising:
   a memory; and
   a processor coupled to the memory, wherein the processor is configured with processor-executable instructions to perform operations comprising:

receiving a message in the recipient's mobile device identifying a device coupled to the recipient's mobile device via a short-range wireless communication technology;

obtaining from the received message instructions for rendering the received message on at least one of the recipient's mobile device or the device coupled to the recipient's mobile device via the short-range wireless communication technology, wherein obtaining from the received message instructions for rendering the received message on at least one of the recipient's mobile device or the device coupled to the recipient's mobile device via the short-range wireless communication technology includes decoding the received message to obtain metadata indicating the device on which the sender desires the received message to be rendered and at least one of sound or visual message contents;

determining whether the device indicated in the metadata is coupled to the recipient's mobile device via the short-range wireless communication technology;

providing the at least one of sound or visual message contents to the device indicated in the metadata in response to determining that the device is coupled to the recipient's mobile device;

generating a delivery confirmation message reporting whether the received message was delivered and, if the received message was delivered, a manner in which the received message was delivered; and transmitting the delivery confirmation message to a sender of the received message.

7. The computing device of claim 6, wherein the processor is configured with processor-executable instructions to perform operations such that reporting the manner in which the received message was delivered includes reporting information describing at least one of an identity of the device coupled to the computing device, a first indicator of whether message contents of the received message were successfully rendered by the device coupled to the computing device, or a second indicator of whether message contents of the received message were queued for rendering by the device coupled to the computing device.

8. The computing device of claim 6, wherein the processor is configured with processor-executable instructions to perform operations such that receiving the message in the computing device comprises receiving at least one of an email, a whisper message, an SMS text message, an audio message, a visual message, a video call, a telephone call, or a message formatted for use with whisper software.

9. The computing device of claim 6, wherein the processor is configured with processor-executable instructions to perform operations further comprising:

receiving input data from at least one of the computing device or the device coupled to the computing device in response to delivering the received message; and generating the delivery confirmation message based on the received input data.

10. The computing device of claim 9, wherein the processor is configured with processor-executable instructions to perform operations such that receiving input data comprises receiving sensor data from at least one of:

a touch sensor;
an accelerometer;
a gyroscope; or
a magnetometer.

11. A non-transitory processor-readable storage medium having stored thereon processor-executable software instructions configured to cause a processor in a computing device to perform operations comprising:

receiving a message in the recipient's mobile device identifying a device coupled to the recipient's mobile device via a short-range wireless communication technology;

obtaining from the received message instructions for rendering the received message on at least one of the recipient's mobile device or the device coupled to the recipient's mobile device via the short-range wireless communication technology, wherein obtaining from the received message instructions for rendering the received message on at least one of the recipient's mobile device or the device coupled to the recipient's mobile device via the short-range wireless communication technology includes decoding the received message to obtain metadata indicating the device on which the sender desires the received message to be rendered and at least one of sound or visual message contents;

determining whether the device indicated in the metadata is coupled to the recipient's mobile device via the short-range wireless communication technology;

providing the at least one of sound or visual message contents to the device indicated in the metadata in response to determining that the device is coupled to the recipient's mobile device;

generating a delivery confirmation message reporting whether the received message was delivered and, if the received message was delivered, a manner in which the received message was delivered; and transmitting the delivery confirmation message to a sender of the received message.

12. The non-transitory processor-readable storage medium of claim 11, wherein the stored processor-executable instructions are configured to cause a processor to perform operations such that reporting the manner in which the received message was delivered includes reporting information describing at least one of an identity of the device coupled to the computing device, a first indicator of whether message contents of the received message were successfully rendered by the device coupled to the computing device, or a second indicator of whether message contents of the received message were queued for rendering by the device coupled to the computing device.

13. The non-transitory processor-readable storage medium of claim 11, wherein the stored processor-executable instructions are configured to cause a processor to perform operations such that receiving the message in the computing device comprises receiving at least one of an email, a whisper message, an SMS text message, an audio message, a visual message, a video call, a telephone call, or a message formatted for use with whisper software.

14. The non-transitory processor-readable storage medium of claim 11, wherein the stored processor-executable instructions are configured to cause a processor to perform operations further comprising:

receiving input data from at least one of the computing device or the device coupled to the computing device in response to delivering the received message; and generating the delivery confirmation message based on the received input data.

15. The non-transitory processor-readable storage medium of claim 14, wherein the stored processor-executable instructions are configured to cause a processor to perform operations such that receiving input data comprises receiving sensor data from at least one of:

a touch sensor;
an accelerometer;
a gyroscope; or
a magnetometer.

16. A computing device comprising:
   means for receiving a message identifying a device coupled to the computing device via a short-range wireless communication technology;
   means for obtaining from the received message instructions for rendering the received message on at least one of the computing device or the device coupled to the computing device via the short-range wireless communication technology, wherein means for obtaining from the received message instructions for rendering the received message on at least one of the recipient's mobile device or the device coupled to the recipient's mobile device via the short-range wireless communication technology includes means for decoding the received message to obtain metadata indicating the device on which the sender desires the received message to be rendered and at least one of sound or visual message contents;
   means for determining whether the device indicated in the metadata is coupled to the recipient's mobile device via the short-range wireless communication technology;
   means for providing the at least one of sound or visual message contents to the device indicated in the metadata in response to determining that the device is coupled to the recipient's mobile device;
   means for generating a delivery confirmation message reporting whether the received message was delivered and, if the received message was delivered, a manner in which the received message was delivered; and
   means for transmitting the delivery confirmation message to a sender of the received message.

17. The computing device of claim 16, wherein means for generating a delivery confirmation message reporting the manner in which the received message was delivered includes means for reporting information describing at least one of an identity of the device coupled to the computing device, a first indicator of whether message contents of the received message were successfully rendered by the device coupled to the computing device, or a second indicator of whether message contents of the received message were queued for rendering by the device coupled to the computing device.

18. The computing device of claim 16, wherein means for receiving the message comprises means for receiving at least one of an email, a whisper message, an SMS text message, an audio message, a visual message, a video call, a telephone call, or a message formatted for use with whisper software.

19. The computing device of claim 16, further comprising:
   means for receiving input data from at least one of the computing device or a device coupled to the computing device in response to the received message; and
   means for generating a response message based on the received input data.

20. The computing device of claim 19, wherein means for receiving input data comprises means for receiving sensor data from at least one of:
   a touch sensor;
   an accelerometer;
   a gyroscope; or
   a magnetometer.

* * * * *